(12) United States Patent
Nishibashi

(10) Patent No.: US 8,478,439 B2
(45) Date of Patent: Jul. 2, 2013

(54) NUMERICAL CONTROL DEVICE FOR TOOL MACHINE

(75) Inventor: Nobutaka Nishibashi, Osaka (JP)

(73) Assignee: Shin Nippon Koki Co., Ltd. (JP)

( * ) Notice: Subject to any disclaimer, the term of this patent is extended or adjusted under 35 U.S.C. 154(b) by 280 days.

(21) Appl. No.: 13/060,443

(22) PCT Filed: Jul. 3, 2009

(86) PCT No.: PCT/JP2009/062192
§ 371 (c)(1),
(2), (4) Date: Feb. 24, 2011

(87) PCT Pub. No.: WO2010/024041
PCT Pub. Date: Mar. 4, 2010

(65) Prior Publication Data
US 2011/0153057 A1 Jun. 23, 2011

(30) Foreign Application Priority Data
Aug. 26, 2008 (JP) ................. 2008-216514

(51) Int. Cl.
| G05B 19/18 | (2006.01) |
| G05B 11/01 | (2006.01) |
| G05B 13/02 | (2006.01) |
| G05B 11/28 | (2006.01) |
| G05B 19/29 | (2006.01) |
| G05B 11/32 | (2006.01) |
| G06F 19/00 | (2006.01) |

(52) U.S. Cl.
USPC ............. 700/192; 700/3; 700/13; 700/19; 700/28; 318/599; 318/603; 318/625

(58) Field of Classification Search
CPC ........... G05B 19/19; G05B 2219/49088; G05B 19/232
USPC ....... 700/3, 13, 19, 28, 61, 69, 192; 318/599, 318/603, 625
See application file for complete search history.

(56) References Cited

U.S. PATENT DOCUMENTS 4,994,978 A * 2/1991 Kawamura et al. ........... 700/188
5,077,507 A * 12/1991 Mitani et al. .................. 318/569
(Continued)

FOREIGN PATENT DOCUMENTS
| JP | 4-172506 | 6/1992 |
| JP | 2003-266202 | 9/2003 |

*Primary Examiner* — Kavita Padmanabhan
*Assistant Examiner* — Darrin Dunn
(74) *Attorney, Agent, or Firm* — Gerald E. Hespos; Michael J. Porco; Matthew T. Hespos

(57) ABSTRACT

A numerical control device includes a primary distribution pulse calculator that calculates primary distribution pulses obtained by distributing movement amounts in first and second directions included in a movement command of a work or a tool for each of predetermined calculation cycles. A secondary distribution pulse calculator calculates, for each movement direction, secondary distribution pulses obtained by distributing the primary distribution pulses of each calculation cycle calculated by the primary distribution pulse calculator, before and after corresponding calculation cycles within ranges of distribution sections across the corresponding calculation cycles and having an acceleration-deceleration time constant of the corresponding movement direction as a section width, and then accumulating the primary distribution pulses for each calculation cycle. A drive controller drives at least one of a tool moving device and a work moving device on the basis of the secondary distribution pulses calculated by the secondary distribution pulse calculator unit.

6 Claims, 22 Drawing Sheets

U.S. PATENT DOCUMENTS

| | | | |
|---|---|---|---|
| 5,079,713 A | * 1/1992 | Kawamura et al. | 700/178 |
| 5,177,421 A | * 1/1993 | Sasaki et al. | 318/571 |
| 5,194,793 A | * 3/1993 | Niimi | 318/568.15 |
| 5,218,281 A | * 6/1993 | Sasaki et al. | 318/600 |
| 5,485,069 A | * 1/1996 | Otsuki et al. | 318/570 |
| 5,532,932 A | * 7/1996 | Niwa | 700/188 |
| 5,654,619 A | 8/1997 | Iwashita | |
| 5,977,736 A | * 11/1999 | Nakazato | 318/568.17 |

\* cited by examiner

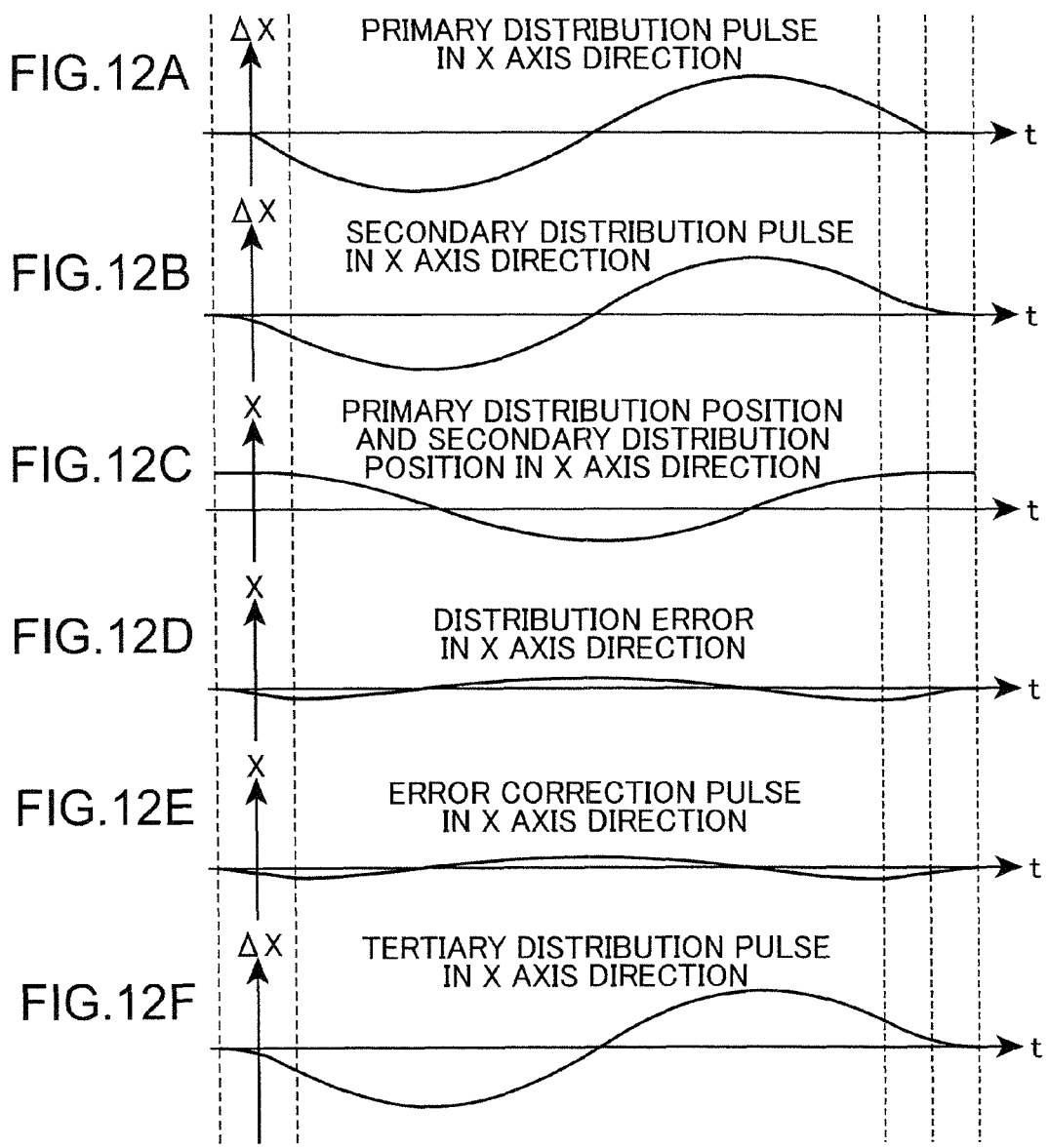

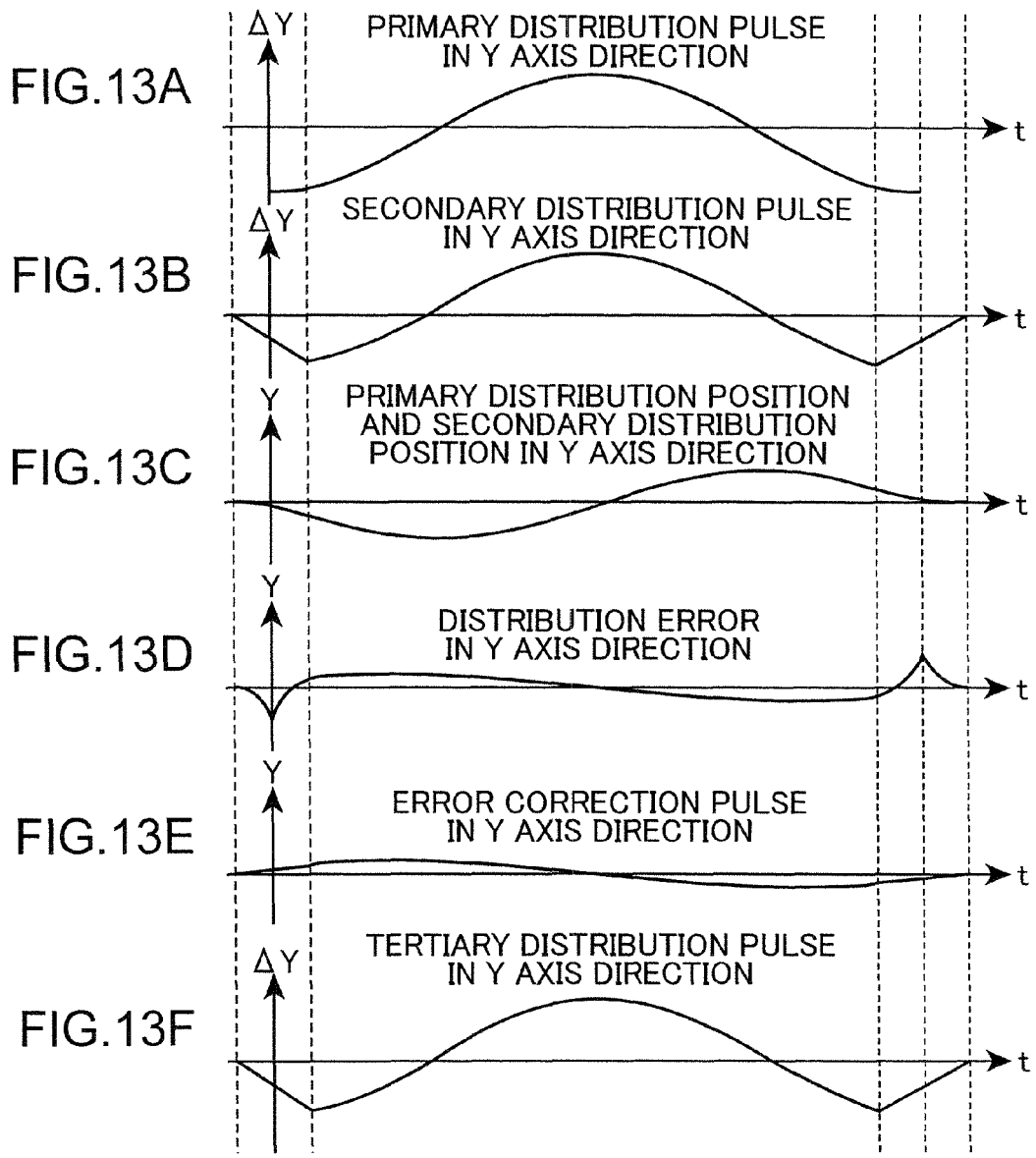

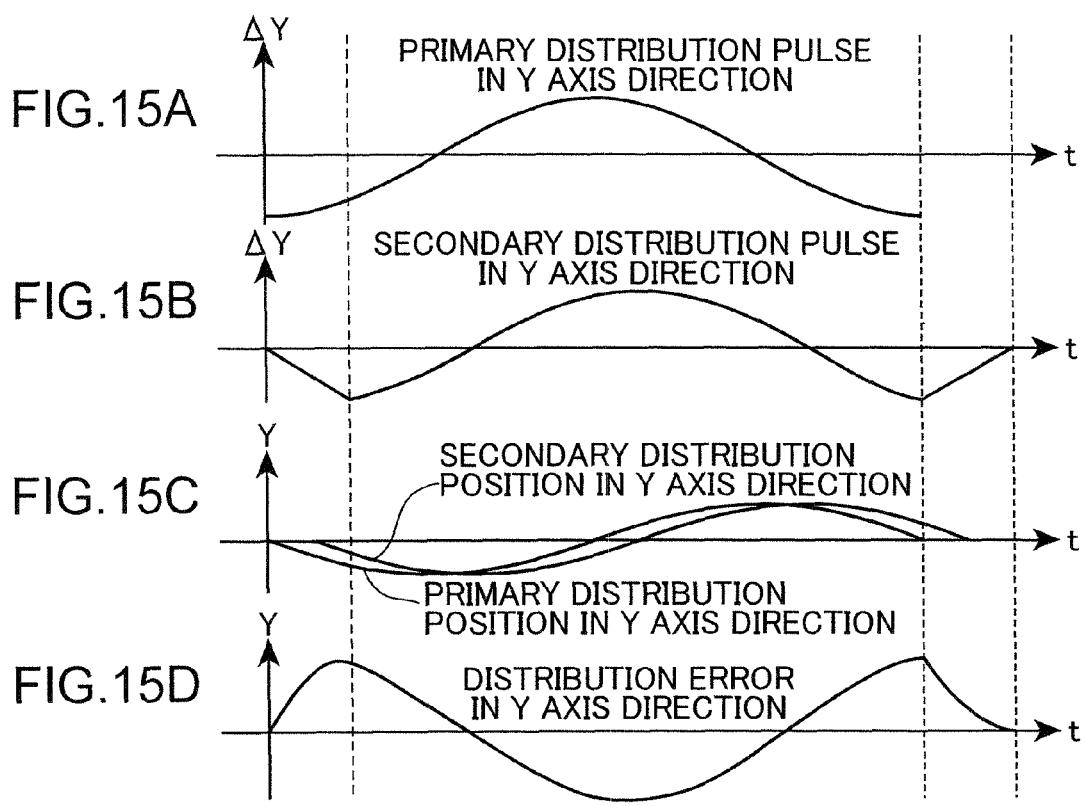

NUMERICAL CONTROL DEVICE FOR TOOL MACHINE

BACKGROUND OF THE INVENTION

1. Field of the Invention

The present invention relates to a numerical control device for a tool machine.

2. Description of the Related Art

A turning device for turning a crankshaft is known as an example of a tool machine (see, for example, JP 2003-266202).

The turning device disclosed in Patent Document 1 includes a work moving device that rotates a crankshaft serving as a work about a C axis, which is an axis of a main journal of the crankshaft, while supporting the crankshaft, and a tool moving device that moves a tool for machining linearly in the X axis direction perpendicular to the C axis and swings the tool about an α axis parallel to the C axis as a center. Further, in this turning device, as the crankshaft is rotated about the C axis by the work moving device, the linear movement of the tool in the X axis direction and the swinging thereof about the α axis performed by the tool moving device are NC controlled. As a result, the tool is moved and a pin journal that is eccentric with respect to the main journal of the crankshaft is machined by turning that follows the eccentric rotation of the pin journal, while the pin journal is eccentrically rotated.

However, the problem associated with typical tool machines, inclusive of such a turning device, is that when the movement directions of a work and a tool include different movement directions, a machining error occurs and the work machining accuracy is thereby decreased.

One of the factors causing the machining error is a phase error between movement directions occurring when the work and the tool are moved in a plurality of mutually different directions at mutually different acceleration-deceleration time constants. This is because setting different acceleration-deceleration time constants in different movement directions causes a difference in a time interval required for acceleration and deceleration between the movement directions, thereby creating a phase error between the movement directions.

Another factor causing the machining error is the so-called inner rotation error of the work and tool. For example, the following phenomenon occurs when a movement command is outputted that requires the movement directions of the work and tool to be changed and the movement speed of the work and tool to be rapidly changed in a predetermined position. Thus, the work and tool actually pass on the interior side of the movement command pass in the predetermined position. This inner rotation error is an error of the actual movement pass of the work and tool with respect to the movement command pass of the work and tool occurring due to such a phenomenon.

More specifically, in the tool machine, a control is typically performed by which primary distribution pulses are calculated by performing uniform primary distribution of a movement amount in each movement direction designated by the movement command for each predetermined calculation cycle, the primary distribution pulses of each calculation cycle are then secondary distributed in a distribution section following the calculation cycle corresponding thereto, and the work and tool are moved according to secondary distribution pulses calculated by accumulating the secondary distributed pulses for each calculation cycle. With such a control, even when a movement command requires rapid changes of movement speeds of the work and tool, the secondary distribution relaxes rapid changes in the movement speed and thereby shocks applied to the tool machine are reduced. However, a delay occurs in the movement positions of the work and tool following the secondary distribution pulses with respect to the movement positions of the work and tool following the movement command, this delay corresponding to the degree of relaxation of variations (acceleration-deceleration) in the movement speeds of the work and tool caused by the secondary distribution. As a result, the work and tool start moving in the changed movement direction before the work and tool reach the predetermined position and therefore the aforementioned inner rotation error occurs.

SUMMARY OF THE INVENTION

It is an object of the present invention to provide a numerical control device for a tool machine that can resolve the above-described problems.

It is an object of the present invention to provide a numerical control device for a tool machine that can increase the work machining accuracy in the case in which the movement directions of a work and a tool include different movement directions.

The numerical control device for a tool machine according to one aspect of the present invention is provided at a tool machine which has a work moving device that moves a work in at least one movement direction and a tool moving device that moves a tool for machining the work in at least one movement direction, in which the movement direction of the work or the movement direction of the tool includes a first movement direction and/or a second movement direction that are different from each other, and in which an acceleration-deceleration time constant of the movement in the first movement direction and an acceleration-deceleration time constant of the movement in the second movement direction are set to mutually different values, the numerical control device serving to control a drive of at least one of the work moving device and the tool moving device, and comprising: a primary distribution pulse calculation unit that calculates primary distribution pulses obtained by distributing individually a movement amount in the first movement direction included in a movement command of the work or a movement command of the tool and a movement amount in the second movement direction included in a movement command of the work or a movement command of the tool for each of predetermined calculation cycles; a secondary distribution pulse calculation unit that calculates, for each of the first movement direction and the second movement direction, secondary distribution pulses obtained by distributing the primary distribution pulses of each of the predetermined calculation cycles, which have been calculated by the primary distribution pulse calculation unit, before and after corresponding calculation cycles within ranges of distribution sections across the corresponding calculation cycles and having the acceleration-deceleration time constant of the corresponding movement direction as a section width, and then accumulating the primary distribution pulses for each of the calculation cycles; and a drive control unit that drives at least one of the tool moving device and the work moving device on the basis of the secondary distribution pulses calculated by the secondary distribution pulse calculation unit.

The numerical control device for a tool machine according to another aspect of the present invention is provided at a tool machine which has a work moving device that moves a work in at least one movement direction and a tool moving device that moves a tool for machining the work in at least one movement direction, and in which the movement direction of the work or the movement direction of the tool includes a first movement direction and/or a second movement direction that are different from each other, the numerical control device serving to control a drive of at least one of the work moving device and the tool moving device, and comprising: a primary distribution pulse calculation unit that calculates primary distribution pulses obtained by distributing individually a movement amount in the first movement direction included in a movement command of the work or a movement command of the tool and a movement amount in the second movement direction included in a movement command of the work or a movement command of the tool for each of predetermined calculation cycles; a secondary distribution pulse calculation unit that calculates, for each of the first movement direction and the second movement direction, secondary distribution pulses obtained by distributing the primary distribution pulses of each of the predetermined calculation cycles, which have been calculated by the primary distribution pulse calculation unit, within ranges of distribution sections across corresponding calculation cycles and having an acceleration-deceleration time constant of the corresponding movement direction as a section width, and then accumulating the primary distribution pulses for each of the calculation cycles, and performs the calculation of the secondary distribution pulses while adjusting a position of the distribution section so as to equalize a distribution amount of the primary distribution pulses in a range from a start point of the distribution section to the corresponding calculation cycle and a distribution amount of the primary distribution pulses in a range from the corresponding calculation cycle to an end point of the distribution section; a tertiary distribution pulse calculation unit that calculates, for each of the first movement direction and the second movement direction, a distribution error which is a difference between a primary distribution position corresponding to a position for each of the calculation cycles in the case of movement according to the primary distribution pulses and a secondary distribution position corresponding to a position for each of the calculation cycles in the case of movement according to the secondary distribution pulses, corrects the secondary distribution position on the basis of the calculated distribution error, and calculates, for each of the first movement direction and the second movement direction, tertiary distribution pulses which are the movement amounts of each of the calculation cycles, from a result of the correction; and a drive control unit that drives at least one of the work moving device and the tool moving device on the basis of the tertiary distribution pulses calculated by the tertiary distribution pulse calculation unit.

BRIEF DESCRIPTION OF THE DRAWINGS

FIG. 12 illustrates primary distribution pulses, secondary distribution pulses, primary distribution position, secondary distribution position, distribution error, error correction pulse, and tertiary distribution pulses in the X axis direction in the second embodiment.
FIG. 13 illustrates primary distribution pulses, secondary distribution pulses, primary distribution position, secondary distribution position, distribution error, error correction pulse, and tertiary distribution pulses in the Y axis direction in the second embodiment.
FIG. 15 illustrates primary distribution pulses, secondary distribution pulses, primary distribution position, secondary distribution position, and distribution error in the Y axis direction in the comparative example.

DETAILED DESCRIPTION OF THE PREFERRED EMBODIMENTS

Figure 1:
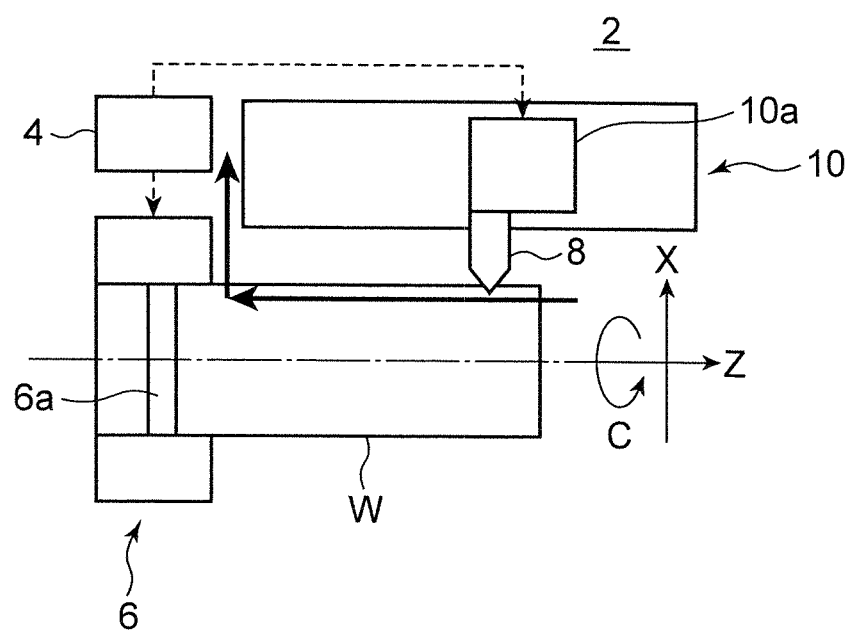
FIG. 1 is a schematic plan view of a tool machine using the numerical control device according to the first embodiment of the present invention.

Embodiments of the present invention will be described below with reference to the appended drawings.
(First Embodiment)
A configuration of a numerical control device 4 of a tool machine 2 according to the first embodiment of the present invention will be described below with reference to FIGS. 1 to 4.
The numerical control device 4 according to the first embodiment is provided at the tool machine 2 such as shown in FIG. 1. The tool machine 2 is a large turning machine capable of forming a spiral groove on an outer circumferential surface of a work W of a cylindrical shape. The tool machine 2 includes a work moving device 6 that rotates the work W about a C axis passing through an axial center thereof and a tool moving device 10 that moves a bit 8 serving as a tool for cutting the work W in the Z axis direction parallel to the axial center of the work W and in the X axis direction perpendicular to the Z axis direction. The direction about the C axis and the Z axis direction and X axis direction are included in the concept of movement direction in accordance with the present invention.

In the work moving device 6, an end portion of the work W is held by a chuck 6a, and the work W is rotated in this state about the C axis. The tool moving device 10 also has a blade table 10a holding the bit 8. The tool moving device 10 moves the bit 8 in the X axis direction and Z axis direction by moving the blade table 10a in the X axis direction and Z axis direction. The work moving device 6 and the tool moving device 10 have respective servo motors (not shown in the figure) as drive sources. In the work moving device 6, the rotation of the work W about the C axis is NC controlled by a drive control of the servo motor. In the tool moving device 10, the movement of the bit 8 in the X axis direction and Z axis direction is NC controlled by a drive control of the servo motor.

The work moving device 6 rotates a large and heavy work W. For this reason, in the work moving device 6, an acceleration-deceleration time constant of rotation of the work W about the C axis is set to a comparatively high value. By contrast, in the tool moving device 10, since the bit 8 and the blade table 10a have comparatively small dimensions and weight, acceleration-deceleration time constants of movement in the X axis direction and Z axis direction can be set to a value less than the acceleration-deceleration time constant of rotation about the C axis in the work moving device 6. The acceleration-deceleration time constants of movement in the X axis direction and Z axis direction can be also set to a large value equal to the acceleration-deceleration time constant of rotation about the C axis, but a problem associated with such a setting is that an inner rotation error increases. For this reason, in the first embodiment, the acceleration-deceleration time constants of movement in the X axis direction and Z axis direction are set to a value less than the acceleration-deceleration time constant of rotation about the C axis. However, where the acceleration-deceleration time constants of movement in the X axis direction and Z axis direction are set to a value less than the acceleration-deceleration time constant of rotation about the C axis, a phase of the work W about the C axis lags with respect to phases of the bit 8 in the X axis direction and Z axis direction, and a phase difference is generated therebetween. However, in the first embodiment, this phase difference can be eliminated by a numerical control of the numerical control device 4, as will be described hereinbelow.

Figure 2:
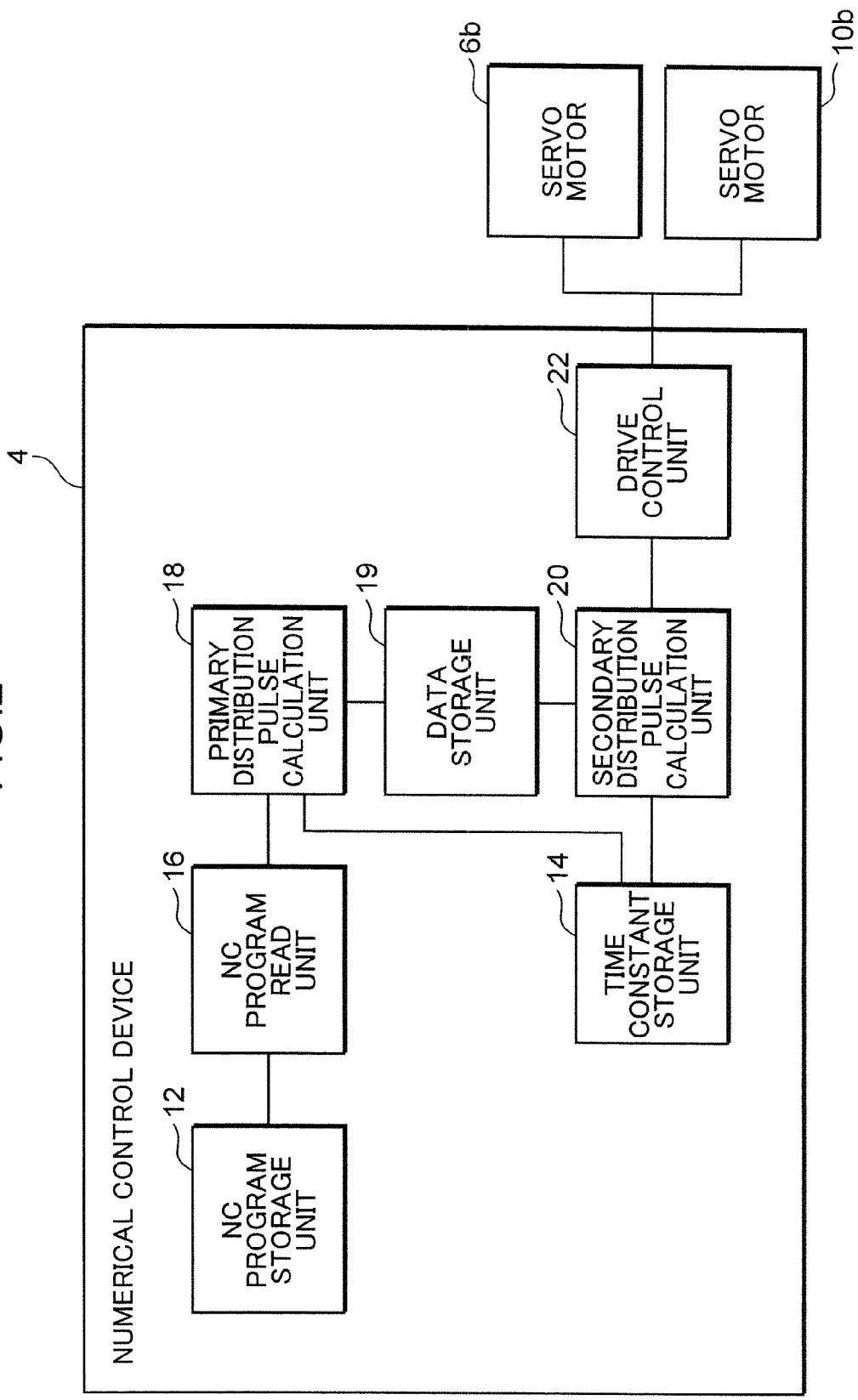
FIG. 2 is a block diagram illustrating the configuration of the numerical control device according to the first embodiment of the present invention.

The numerical control device 4 according to the first embodiment, controls the drive of the work moving device 6 and the drive of the tool moving device 10 in the tool machine 2 of the above-described configuration. As shown in FIG. 2, the numerical control device 4 has a NC program storage unit 12, a time constant storage unit 14, a NC program read unit 16, a primary distribution pulse calculation unit 18, a data storage unit 19, a secondary distribution pulse calculation unit 20, and a drive control unit 22.

The NC program storage unit 12 is a part storing a NC program serving as a movement command for the work moving device 6 and the tool moving device 10. The NC program stored in the NC program storage unit 12 includes commands relating to a feed speed (combined speed of movement speeds in the aforementioned movement directions) and movement amounts in the aforementioned movement directions.

The time constant storage unit 14 is a part storing the acceleration-deceleration time constant of rotation about the C axis, acceleration-deceleration time constant of movement in the X axis direction, acceleration-deceleration time constant of movement in the Z axis direction, and a time length of the below-described calculation cycle.

The NC program read unit 16 receives the input of the NC program from the user of the tool machine 2 and stores and manages the inputted NC program in the NC program storage unit 12. Further, the NC program read unit 16 reads consecutively the NC program stored in the NC program storage unit 12, analyzes the program, and appropriately starts the primary distribution pulse calculation unit 18, the secondary distribution pulse calculation unit 20, and the drive control unit 22 according to the analyzed contents.

The primary distribution pulse calculation unit 18 calculates primary distribution pulses in which a rotation amount of the work W about the C axis and the movement amounts of the bit 8 in the X axis direction and in the Z axis direction that are contained in the NC program are uniformly distributed among respective predetermined calculation cycles, on the basis of a feed speed designated by the NC program that has been read and analyzed by the NC program read unit 16. In other words, the primary distribution pulses calculated by the primary distribution pulse calculation unit 18 are represented as very small movement amounts for each of the calculation cycles that are obtained by uniformly distributing the movement amounts in each of the movement directions included in the NC program for each of the predetermined calculation cycles under an assumption that the rotation of the work W about the C axis and the movement of the bit 8 in the Z axis direction and the X axis direction are performed at respective equal speeds such that satisfy the feed speed designated by the NC program.

Figure 3:
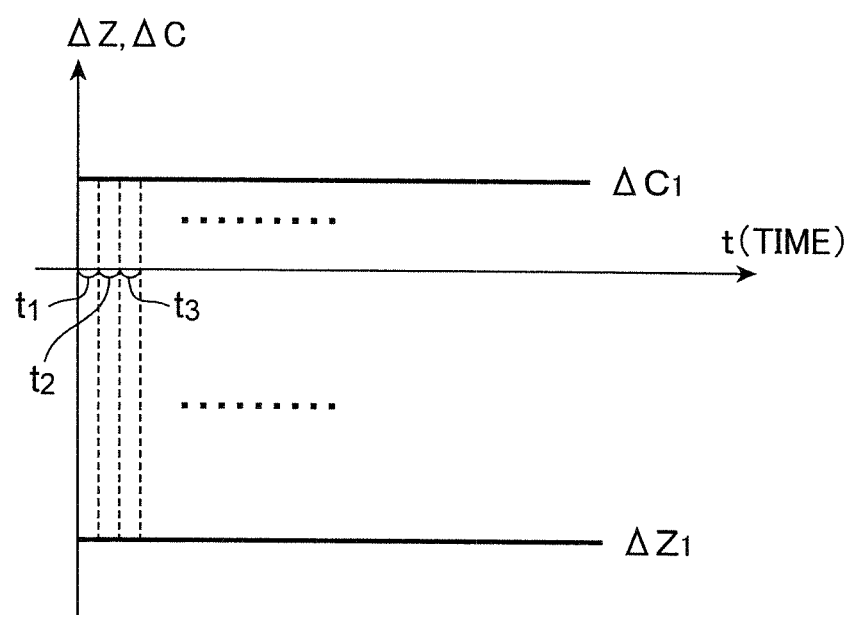
FIG. 3 illustrates primary distribution pulses in the first embodiment.

More specifically, when the NC program designates the rotation of the work W about the C axis and the movement of the bit 8 in the Z axis direction, but does not designate the movement of the bit 8 in the X axis direction, a primary distribution pulse $\Delta C_1$ about the C axis and a primary distribution pulse $\Delta Z_1$ of the Z axis direction of each of the calculation cycles $t_1, t_2, t_3, \ldots$, (for example, each 1 msec) will assume respective constant values, as shown in FIG. 3.

The data storage unit 19 is a part that stores primary distribution pulses about the C axis, primary distribution pulses in the Z axis direction, and primary distribution pulses in the X axis direction for each of the calculation cycles that have been calculated by the primary distribution pulse calculation unit 18.

The secondary distribution pulse calculation unit 20 calculates secondary distribution pulses for each of the rotation about the C axis, movement in the Z axis direction, and movement in the X axis direction by performing secondary distribution of the primary distribution pulses about the C axis, primary distribution pulses in the Z axis direction, and primary distribution pulses in the X axis direction calculated by the primary distribution pulse calculation unit 18 and then accumulating the primary distribution pulses for each of the calculation cycles. The secondary distribution pulse calculation unit 20 performs the secondary distribution by reading the primary distribution pulses that have been stored in the data storage unit 19 after the calculation performed by the primary distribution pulse calculation unit 18.

More specifically, when the secondary distribution pulse calculation unit 20 performs the secondary distribution of the primary distribution pulses $\Delta C_1$ about the C axis and the primary distribution pulses $\Delta Z_1$ in the Z axis direction shown in FIG. 3, the secondary distribution pulse calculation unit 20 equally distributes the primary distribution pulses $\Delta C_1$ about the C axis and the primary distribution pulses $\Delta Z_1$ in the Z axis direction for each of the calculation cycles $t_1, t_2, t_3, \ldots$, across the corresponding calculation cycles $t_1, t_2, t_3, \ldots$, and within a range of a distribution section having a section span equal to an acceleration-deceleration time constant of the corresponding movement direction. In this case, the secondary distribution pulse calculation unit 20 performs the distribution of the primary distribution pulses $\Delta C_1$ about the C axis while adjusting a position of the distribution section so as to equalize a distribution amount of the primary distribution pulses $\Delta C_1$ about the C axis in a range from a start point of the distribution section to the corresponding calculation cycle and a distribution amount of the primary distribution pulses $\Delta C_1$ about the C axis in a range from the corresponding calculation cycle to an end point of the distribution section. Further, the secondary distribution pulse calculation unit 20 performs the distribution of the primary distribution pulses $\Delta Z_1$ in the Z axis direction while adjusting a position of the distribution section so as to equalize a distribution amount of the primary distribution pulses $\Delta Z_1$ in the Z axis direction in a range from a start point of the distribution section to the corresponding calculation cycle and a distribution amount of the primary distribution pulses $\Delta Z_1$ in the Z axis direction in a range from the corresponding calculation cycle to an end point of the distribution section.

For example, when the calculation cycles $t_1, t_2, t_3, \ldots$, are set to 1 msec each and the acceleration-deceleration time constant about the C axis is set to 500 msec, the distribution section of the primary distribution pulses $\Delta C_1$ about the C axis of the calculation cycle $t_1$ is set in a range of $[t_1-250, t_1+249]$. Further, the primary distribution pulses $\Delta C_1$ of the calculation cycle $t_1$ is further equally distributed in the range of the distribution section as a smaller movement amount. When the acceleration-deceleration time constant in the Z axis direction is set to 10 msec, the distribution section of the primary distribution pulses $\Delta Z_1$ in the Z axis direction of the calculation cycle $t_1$ is set in a range of $[t_1-5, t_1+4]$. Further, the primary distribution pulses $\Delta Z_1$ of the calculation cycle $t_1$ is further equally distributed in the range of the distribution section as a smaller movement amount. Thus, the central point of the distribution section of the primary distribution pulses $\Delta C_1$ about the C axis of the calculation cycle $t_1$ matches the calculation cycle $t_1$, and the central point of the distribution section of the primary distribution pulses $\Delta Z_1$ in the Z axis direction of the calculation cycle $t_1$ matches the calculation cycle $t_1$. The primary distribution pulses $\Delta C_1$ about the C axis in the calculation cycle $t_2$ and subsequent calculation cycles and the primary distribution pulses $\Delta Z_1$ in the Z axis direction in the calculation cycle $t_2$ and subsequent calculation cycles are distributed in the same manner as described above, while gradually shifting the distribution section backward.

The secondary distribution pulse calculation unit 20 accumulates the primary distribution pulses $\Delta C_1$ about the C axis and the primary distribution pulses $\Delta Z_1$ in the Z axis direction that have been distributed to distribution sections in the above-described manner for each calculation cycle of 1 msec. As a result, secondary distribution pulses $\Delta C_2, \Delta Z_2$ such as shown in FIG. 4 are obtained.

A movement amount (rotation amount) in the case in which the movement is performed according to the secondary distribution pulses $\Delta C_2$ about the C axis within a period in which the rotation about the C axis accelerates from the beginning of the rotation to a constant speed, that is, within a period corresponding to an acceleration-deceleration time constant (500 msec) of the rotation about the C axis from the beginning of the rotation about the C axis, becomes equal to the movement amount (rotation amount) in the case in which the movement is performed according to the primary distribution pulses $\Delta C_1$ about the C axis shown in FIG. 3 in a period from the very first calculation cycle $t_1$, from among the calculation cycles $t_1, t_2, t_3, \ldots$, to the point of time at which the rotation speed in the secondary distribution pulses $\Delta C_2$ reaches the constant speed. Further, the movement amount in the case in which the movement is performed according to the secondary distribution pulses $\Delta Z_2$ in the Z axis direction within a period in which the movement in the Z axis direction accelerates from the beginning of the movement to a constant speed, that is, within a period corresponding to an acceleration-deceleration time constant (10 msec) of the movement in the Z axis direction from the beginning of the movement in the Z axis direction, becomes equal to the movement amount in the case in which the movement is performed according to the primary distribution pulses $\Delta Z_1$ in the Z axis direction shown in FIG. 3 in a period from the very first calculation cycle $t_1$, from among the calculation cycles $t_1, t_2, t_3, \ldots$, to the point of time at which the movement speed in the secondary distribution pulses $\Delta Z_2$ reaches the constant speed. In other words, at the point of time at which the rotation about the C axis reaches the constant speed, the phase of the rotation about the C axis becomes equal to the phase in the case in which the rotation about the C axis has been performed at the constant speed from the very first calculation cycle $t_1$. Further, at the point of time at which the movement in the Z axis direction reaches the constant speed, the phase of the movement in the Z axis direction becomes equal to the phase in the case in which the movement in the Z axis direction has been performed at the constant speed from the very first calculation cycle $t_1$.

Figure 4:
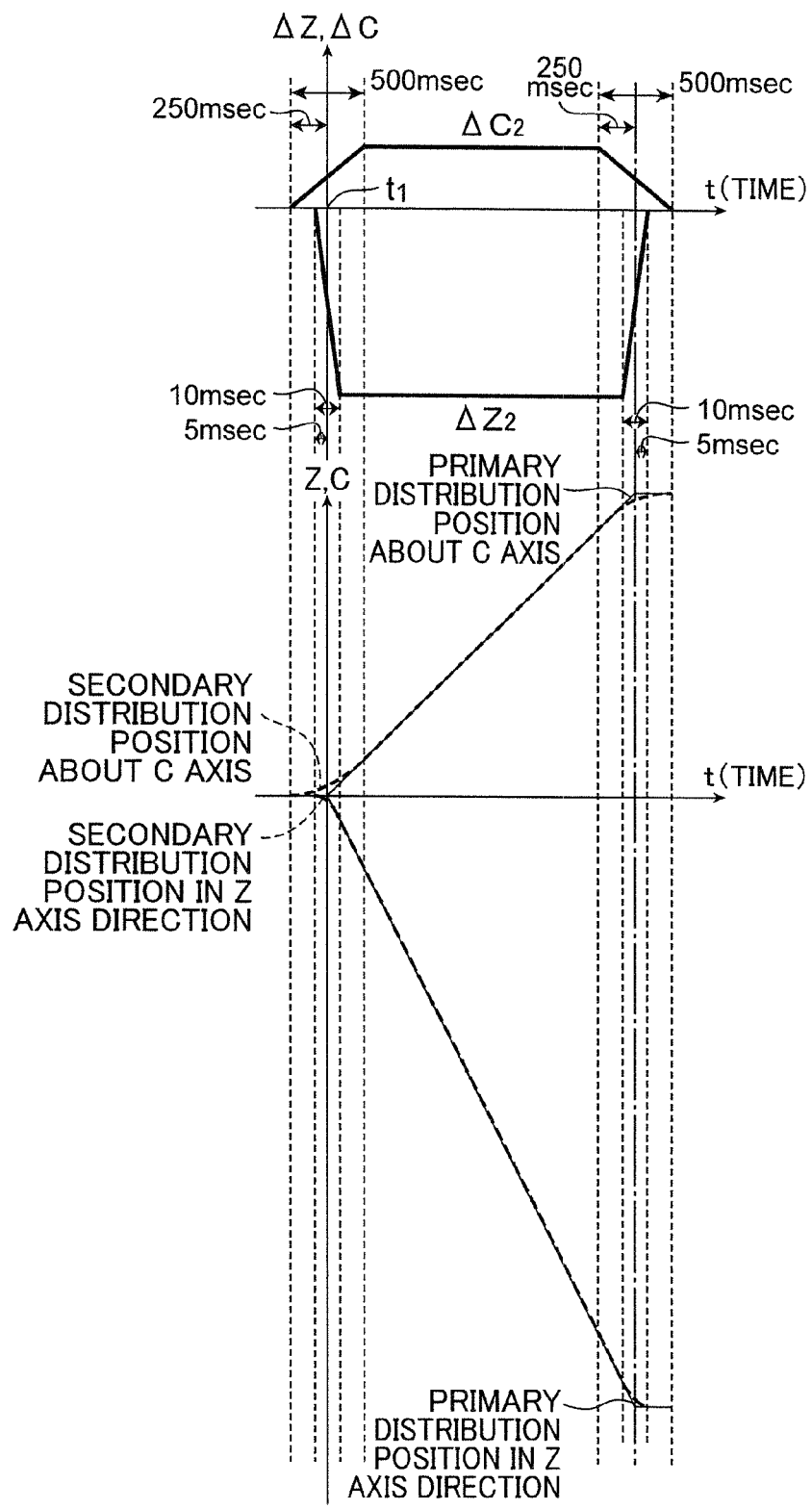
FIG. 4 illustrates the relationship between the secondary distribution pulses, primary distribution position, and secondary distribution position in the first embodiment.
Figure 5:
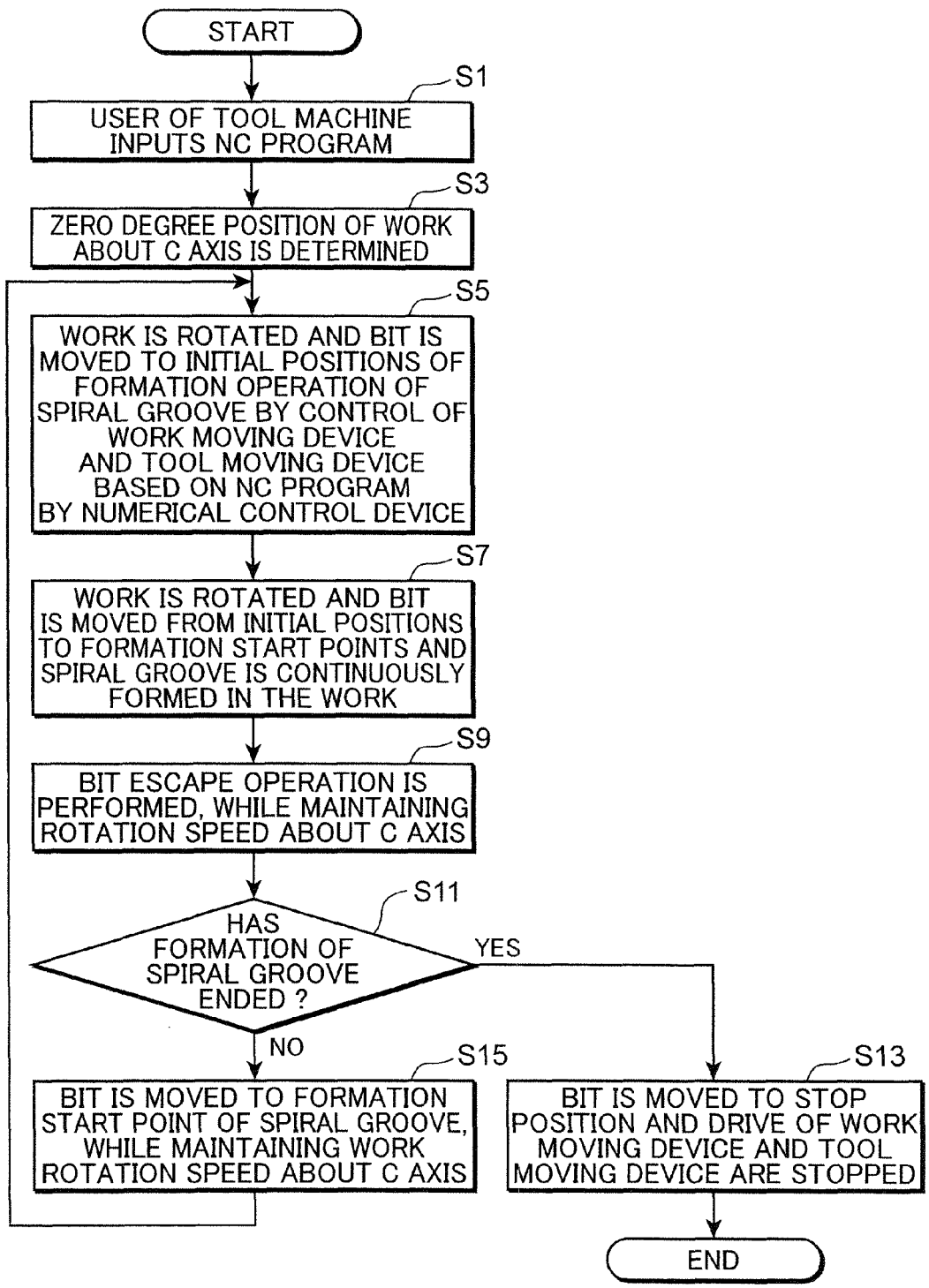
FIG. 5 is a flowchart illustrating a process of controlling the tool machine with the numerical control device according to the first embodiment when a spiral groove is formed in a work.

Further, as shown in FIG. 4, the secondary distribution position representing the position about the C axis in the case in which the rotation is performed according to the secondary distribution pulses $\Delta C_2$ about the C axis matches the primary distribution position representing the position about the C axis in the case in which the rotation is performed according to the primary distribution pulses $\Delta C_1$ about the C axis in the section where the rotation speed about the C axis reaches a constant speed. Further, the secondary distribution position representing the position in the Z axis direction in the case in which the movement is performed according to the secondary distribution pulses $\Delta Z_2$ in the Z axis direction matches the primary distribution position representing the position in the Z axis direction in the case in which the movement is performed according to the primary distribution pulses $\Delta Z_1$ in the Z axis direction in the section where the movement speed in the Z axis direction reaches a constant speed. This means, that where the period required to reach a constant speed is long, in other words, where the rotation about the C axis with a large acceleration-deceleration time constant reaches a constant speed, the phase of the rotation about the C axis and the phase of movement in the Z axis direction both match the phase designated by the NC program. As a result, the difference in phase between the rotation about the C axis and the movement in the Z axis direction is eliminated.

The drive control unit 22 drives the work moving device 6 and the tool moving device 10 on the basis of the secondary distribution pulses in each movement direction calculated by the secondary distribution pulse calculation unit 20. More specifically the drive control unit 22 outputs the secondary distribution pulses about the C axis calculated by the secondary distribution pulse calculation unit 20 to the servo motor 6b of the work moving device 6 and outputs the secondary distribution pulses in the Z axis direction and X axis direction to the servo motor 10b of the tool moving device 10. The servo motor 6b of the work moving device 6 is driven according to the secondary distribution pulses about the C axis of each of the calculation cycles outputted from the drive control unit 22. As a result, the servo motor 6b rotates the work W at a rotation amount of each of the calculation cycles corresponding to the secondary distribution pulses. The servo motor 10b of the tool moving device 10 is driven according to the secondary distribution pulses in the Z axis direction and X axis direction of each of the calculation cycles outputted from the drive control unit 22. As a result, the servo motor 10b moves the blade table 10a together with the bit 8 in the Z axis direction and X axis direction by a movement amount of each of the calculation cycles corresponding to the secondary distribution pulses.

A control process of the tool machine 2 performed by the numerical control device 4 of the first embodiment will be explained below with reference to FIGS. 1 to 6.

As a preparation, a person adjusting the tool machine 2 inputs and sets parameters such as a time interval length of calculation cycles, an acceleration-deceleration time constant about the C axis, an acceleration-deceleration time constant in the X axis direction, and an acceleration-deceleration time constant in the Z axis direction in the numerical control device 4. These values inputted in the numerical control device 4 are stored and managed in the time constant storage unit 14.

In this state, the user of the tool machine 2 inputs a NC program in the numerical control device 4 (step S1). A feed speed and movement amounts in each direction, that is, about the C axis, in the Z axis direction, and in the X axis direction are included in the NC program inputted in the numerical control device 4. The NC program is stored and managed in the NC program storage unit 12.

A 0 degree position (original point) of the work W about the C axis is then set (step S3). In this case, a key groove formed in the work W is taken as a reference and the 0 degree position is set such that a rotation angle about the C axis at a formation start point of the below-described spiral groove becomes 0 degrees.

The work W is then rotated and the bit 8 is moved to the initial position of the spiral groove formation operation by a control of the work moving device 6 and the tool moving device 10 performed by the numerical control device 4 on the basis of the NC program (step S5). The initial position is a position in front of the formation start point in which the bit 8 comes actually into contact with the work W and the formation of the spiral groove is started and a position on an extension line of the spiral groove that should be formed. More specifically, with respect to rotation about the C axis, the initial position is set to a position that can ensure a sufficient rotation angle such that makes it possible for the rotation speed thereof to increase to a constant speed during the spiral groove formation operation at the point of time at which the work W reaches the rotation angle of the formation start point after starting the rotation from this initial position. Where the rotation angle about the C axis from the initial position to the formation start point is insufficient to accelerate the rotation to the constant speed, the initial position may be set so as to enable the rotation with a 360-degree margin. In the Z axis direction, the initial position is set to a position that can ensure a sufficient movement distance such that makes it possible for the movement speed in the Z axis direction to increase to a constant speed during the spiral groove formation operation at the point of time at which the bit 8 reaches the formation start point after starting the movement from the initial position.

Following the step S5, the work W is rotated and the bit 8 is moved from the initial position to the formation start point under the control of the work moving device 6 and the tool moving device 10 performed by the numerical control device 4. Cutting of the external circumferential surface of the work W is thereafter conducted by the bit 8 in a continuous mode and thereby a spiral groove is formed (step S7).

Figure 6:
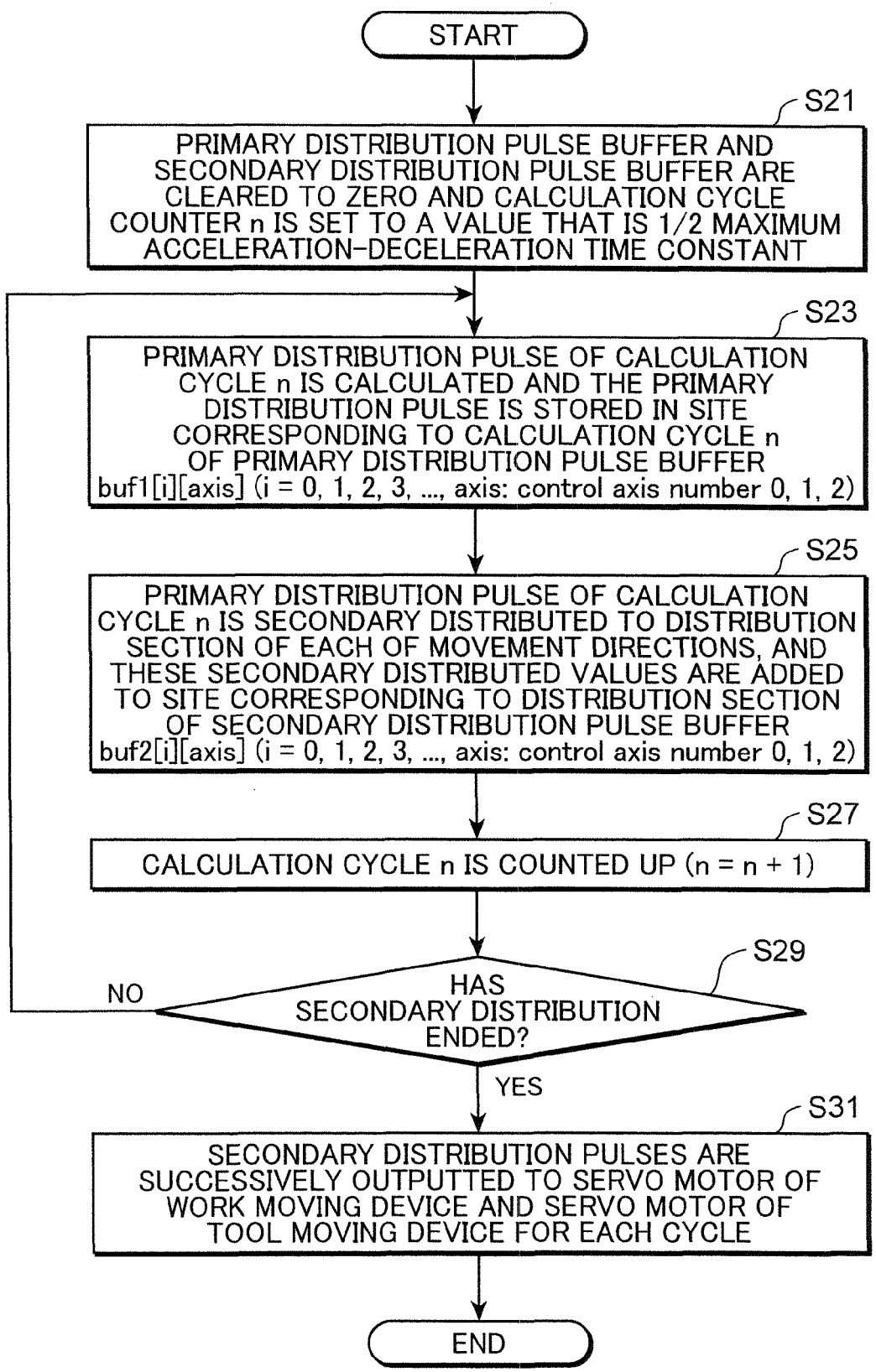
FIG. 6 is a flowchart illustrating a process of numerical control in the numerical control device according to the first embodiment.

In this case, a numerical control according to the flowchart shown in FIG. 6 is performed in the numerical control device 4. First, a primary distribution pulse buffer and a secondary distribution pulse buffer (not shown in the figure) with a sufficient capacity provided in the data storage unit 19 are cleared to zero, and a calculation cycle counter n (not shown in the figure) provided in the data storage unit 19 is initially set to a value which is ½ the maximum value of the acceleration-deceleration time constant in each movement direction (in the present embodiment, an acceleration-deceleration time constant about the C axis) (step S21). The calculation cycle counter n is set to ½ the maximum value in order to adjust the position of the distribution section so that the central point of the distribution section in each of the aforementioned movement directions match the calculation cycle n.

The primary distribution pulse calculation unit 18 then calculates the primary distribution pulses of the calculation cycle n for each movement direction on the basis of values set by the NC program. The primary distribution pulse calculation unit 18 then stores the calculated primary distribution pulses in each movement direction in a respective site buf1[n][axis] corresponding to the calculation cycle n of each movement direction, from among the primary distribution pulse buffers buf1[axis] (where i=0, 1, 2, 3, . . . , axis: control axis numbers 0, 1, 2 corresponding to about the C axis, in the X axis direction, and in the Z axis direction, respectively) (step S23).

Then, the secondary distribution pulse calculation unit 20 reads the primary distribution pulses of the calculation cycle n of each movement direction stored in the primary distribution pulse buffer of the data storage unit 19. The secondary distribution pulse calculation unit 20 performs secondary distribution of the primary distribution pulses that have been read out in the distribution section of each movement direction and adds the secondary distributed values to the site corresponding to the distribution section of each movement direction, from among the secondary distribution pulse buffers buf2[i][axis] (where i=0, 1, 2, 3, . . . , axis: control axis numbers 0, 1, 2 corresponding to about the C axis, in the X axis direction, and in the Z axis direction, respectively) (step S25).

More specifically, where an acceleration-deceleration time constant of each movement direction is denoted by T[axis], a value obtained by secondary distribution of primary distribution pulses of calculation cycle n of each of the movement directions will be buf1[n][axis]/T[axis]. The secondary distribution pulse calculation unit 20 adds this value to each of the values of sites buf2[n−T[axis]/2][axis], . . . , buf2[n][axis], buf2[n+1][axis], buf2[n+2][axis], . . . , buf2[n+T[axis]/2−1][axis] corresponding to the distribution section of each of the movement directions, from among the secondary distribution pulse buffers. These distribution sections buf2[n−T[axis]/2][axis], . . . , buf2[n][axis], buf2[n+1][axis], buf2[n+2][axis], . . . , buf2[n+T[axis]/2−1][axis] are uniform ranges spanning across the buf2[n] corresponding to the calculation cycle n, having the acceleration-deceleration time constant T[axis] of the corresponding movement direction as a section width, and arranged before and after the buf2[n] corresponding to the calculation cycle n as a center. The centers of distribution sections of all of the movement directions are arranged in the buf2[n] corresponding to the present calculation cycle n.

The calculation cycle counter n is then counted up to n+1 (step S27).

It is thereafter determined whether the primary distribution pulses of all of the calculation cycles have been secondary distributed (step S29). In this case, when it is determined that the secondary distribution of the primary distribution pulses of all of the calculation cycles has not yet ended, the process of step S23 and subsequent steps is repeated, and the values obtained by the secondary distribution in the same manner as described above are added to the secondary distribution pulse buffer, while the distribution section is gradually shifted rearward. Where it is determined in step S29 that the secondary distribution of the primary distribution pulses of all of the calculation cycles has ended, the values accumulated in the secondary distribution pulse buffer are taken as the secondary distribution pulses and the drive control unit 22 successively outputs the secondary distribution pulses of each of the cycles to the servo motor 6b of the work moving device 6 and the servo motor 10b of the tool moving device 10 (step S31). As a result, the work moving device 6 and the tool moving device 10 are driven, the work W rotates, and the bit 8 moves according to the secondary distribution pulses of each of the movement directions. As a result, a spiral groove is formed in the work W.

Returning to FIG. 5, where a position is reached in which the spiral groove formation ends, an escape operation of the bit 8 is performed in which the bit 8 is separated from the work W, while the rotation speed of the work W about the C axis is maintained (step S9). This escape operation of the bit 8 is constituted by a first escape operation performed before the bit 8 is separated from the work W and a second escape operation performed after the first escape operation so that the bit 8 escapes only in the X axis direction towards a stop position.

The first escape operation is performed under conditions such that the rotation speed of the work W about the C axis and the movement speed of the bit 8 in the Z axis direction are maintained at the same level as during the spiral groove formation and such that the bit 8 moves at the highest speed in the X axis direction. Further, in the second escape operation, the rotation speed of the work W about the C axis is maintained at the same level as during the spiral groove formation, and after the movement of the bit 8 in the Z axis direction has stopped, the bit 8 is separated from the work W in the X axis direction. Before the bit 8 is so separated from the work W, the rotation speed of the work W about the C axis and the movement speed of the bit 8 in the Z axis direction are maintained at the same level as during the spiral groove formation, but at the point of time at which the bit 8 has separated from the work W, the second escape operation stops the movement of the bit 8 in the Z axis direction and causes the bit 8 to escape only in the X axis direction. As a result, the final portion of the spiral groove is formed such as to extend along the extension line of the spiral groove and such that the groove depth decreases gradually. As a consequence, by contrast with the case in which the movement of the bit 8 in the Z axis direction is stopped when the bit 8 is still in contact with the work W, the bit 8 is prevented from forming in the outer circumferential surface of the work W a scratch extending in the direction of withdrawal from the extension line of the spiral groove in the end portion of the spiral groove.

It is then determined whether the formation of the spiral groove has ended (step S11). Where the formation of the spiral groove is determined to have ended, the bit 8 is moved to a stop position in a state in which the rotation speed of the work W about the C axis is maintained. Further, in this case, after the bit 8 has sufficiently separated from the work W, the drive of the work moving device 6 is stopped, and the rotation of the work W is stopped. At the point of time at which the bit 8 has reached to the stop position, the drive of the tool moving device 10 is stopped and the movement of the bit 8 is stopped (step S 13). When it is determined that the formation of the spiral groove has not ended, that is, when it is determined that the operation of forming the spiral groove is repeatedly performed to form a deeper spiral groove, an initial position is determined in which the position of the bit 8 in the X axis direction is slightly shifted radially inward of the work W from the initial position of the previous cycle in order to make the spiral groove deeper than in the previous cycle, the bit 8 is moved to this initial position, while maintaining the rotation speed of the work W about the C axis, and the processing of step S5 and subsequent steps is repeated (step S15).

The control of the tool machine 2 by the numerical control device 4 is thus performed when a spiral groove is formed in the work W.

As described above, in the numerical control device 4 of the first embodiment, the secondary distribution pulse calculation unit 20 calculates the secondary distribution pulses while adjusting the position of the distribution section so that the distribution amount of the primary distribution pulses in a range from the start point of the distribution section to the corresponding calculation cycle and the distribution amount of the primary distribution pulses in a range from the corresponding calculation cycle to the end point of the distribution section are equalized. Therefore, at the point of time at which the rotation about the C axis reaches a constant speed, the secondary distribution position about the C axis becomes equal to the position in the case in which the rotation about the C axis has been performed at the same speed equal to the constant speed from the very first calculation cycle $t_1$ (primary distribution position about the C axis), and the secondary distribution position in the Z axis direction becomes equal to the position in the case in which the movement in Z axis direction has been performed at the same speed equal to the constant speed from the very first calculation cycle $t_1$ (primary distribution position in the Z axis direction). In other words, at the point of time at which the rotation about the C axis has reached the constant speed thereof after the movement in the Z axis direction had reached the constant speed thereof, the secondary distribution position about the C axis and the secondary distribution position in the Z axis direction can be respectively matched with the primary distribution position about the C axis and the primary distribution position in the Z axis direction, without a phase error therebetween. As a result, at this point it time, an error between the secondary distribution position about the C axis and the secondary distribution position in the Z axis direction can be eliminated.

Figure 7:
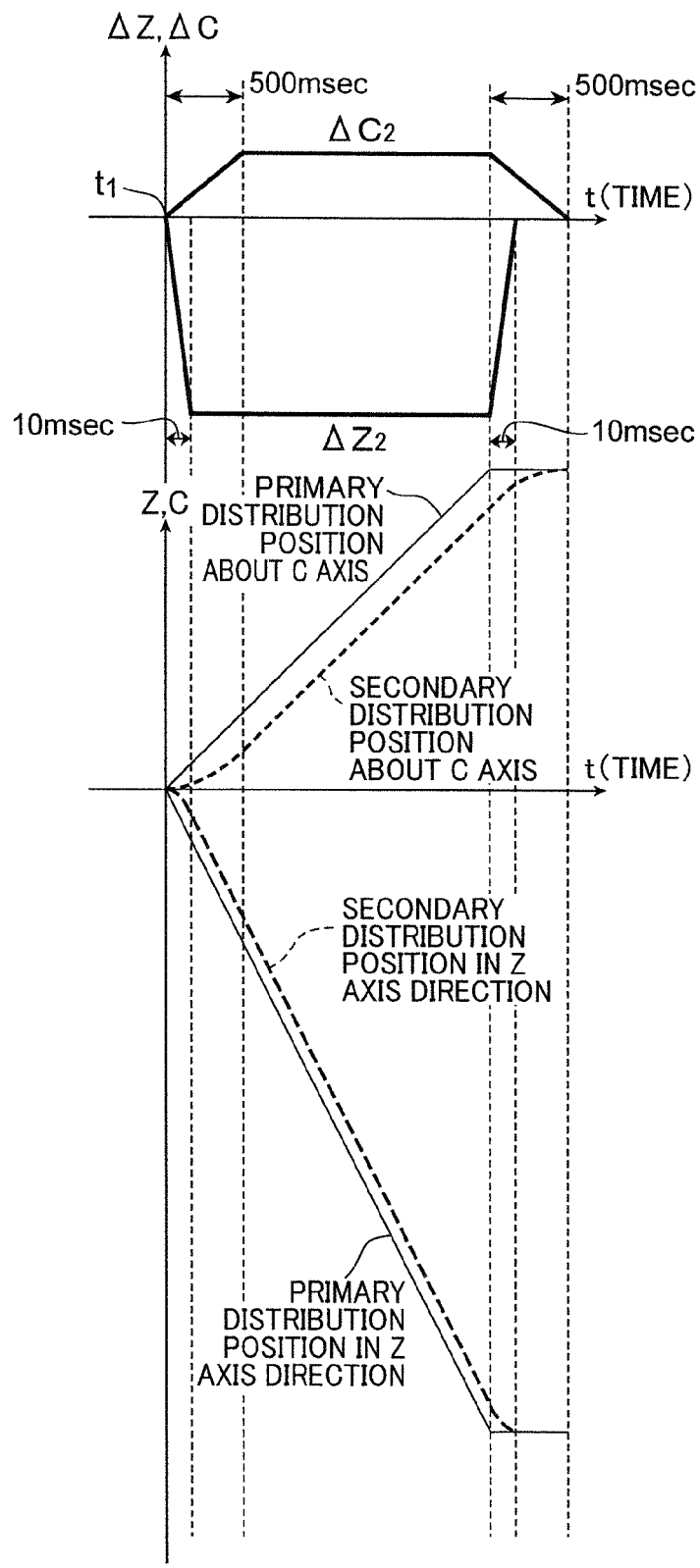
FIG. 7 illustrates the relationship between the secondary distribution pulses, primary distribution position, and secondary distribution position in a comparative example of the first embodiment.

In the configuration in which the primary distribution pulses are secondary distributed only in the distribution section after the corresponding calculation cycle, as in the comparative example shown in FIG. 7, the secondary distribution position about the C axis has a phase lag with respect to the primary distribution position about the C axis, and the secondary distribution position in the Z axis direction has a phase lag with respect to the primary distribution position in the Z axis direction. Further, due to the difference between the acceleration-deceleration time constant about the C axis and the acceleration-deceleration time constant in the Z axis direction, the amount of phase lag of the secondary distribution position about the C axis with respect to the primary distribution position about the C axis differs from the amount of phase lag of the secondary distribution position in the Z axis direction with respect to the primary distribution position in the Z axis direction. Thus, the amount of phase lag of the secondary distribution position about the C axis with respect to the primary distribution position about the C axis is larger than the amount of phase lag of the secondary distribution position in the Z axis direction with respect to the primary distribution position in the Z axis direction. For this reason, an error occurs between the secondary distribution position about the C axis and the secondary distribution position in the Z axis direction. As a result, the machining error of the work W increases. By contrast, in the first embodiment, as described hereinabove, at the point of time at which the rotation about the C axis has reached a constant speed, the secondary distribution position about the C axis and the secondary distribution position in the Z axis direction can be respectively matched with the primary distribution position about the C axis and the primary distribution position in the Z axis direction, without a phase error therebetween. Therefore, at this point in time, the error between the secondary distribution position about the C axis and the secondary distribution position in the Z axis direction such as occurs in the comparative example can be eliminated. As a result, in the first embodiment, the machining error of the work W can be reduced and machining accuracy of the work W with the tool machine 2 can be increased.

(Second Embodiment)

A configuration of a numerical control device 34 for a tool machine 32 according to the second embodiment of the present embodiment will be described below with reference to FIG. 8 and FIG. 9.

Figure 8:
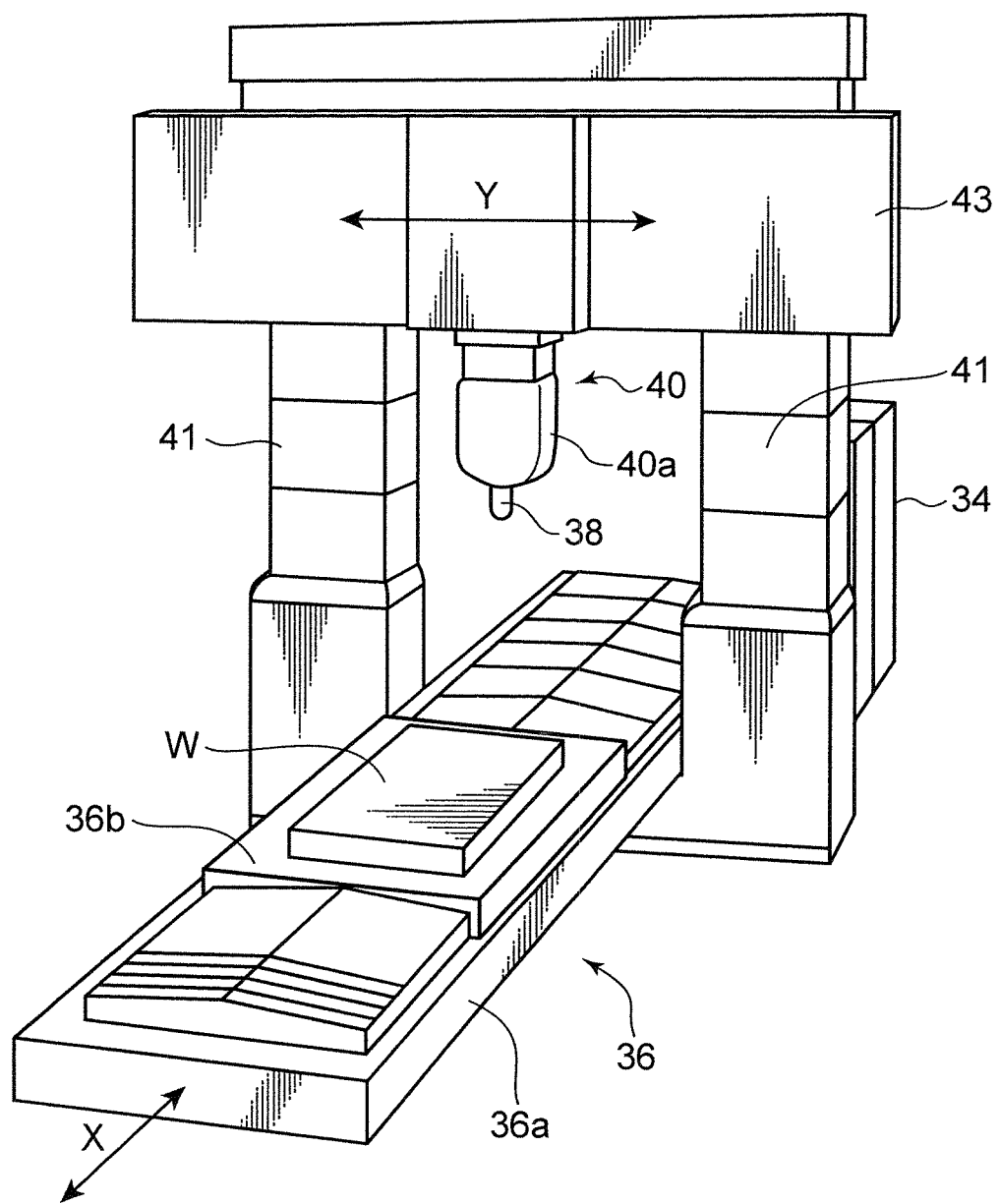
FIG. 8 is a schematic perspective view of a tool machine using the numerical control device according to the second embodiment of the present invention.
Figure 9:
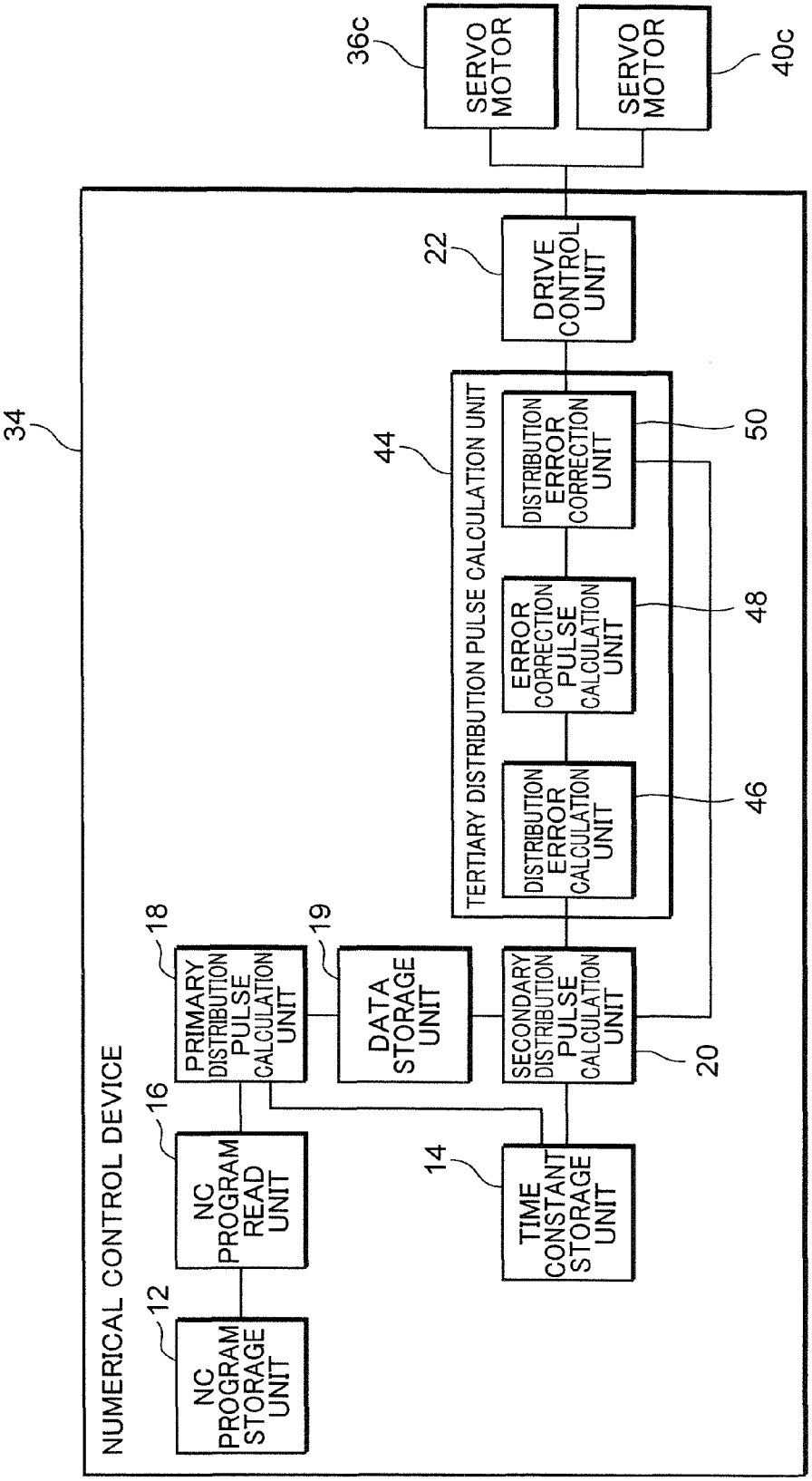
FIG. 9 is a block diagram illustrating the configuration of the numerical control device according to the second embodiment of the present invention.

The numerical control device 34 according to the second embodiment is provided, for example, at the tool machine 32 such as shown in FIG. 8. The tool machine 32 is provided with a work moving device 36 that moves the work W in the X axis direction on a horizontal plane and a tool moving device 40 that moves a tool 38 for cutting the work W in the Y axis direction perpendicular to the X axis direction on the plane. The X axis direction and the Y axis direction are included in the concept of the first movement direction and the second movement direction in accordance with the present invention.

The work moving device 36 is provided with a bed 36a fixed on an arrangement surface, a table 36b disposed on the bed 36a so that the table can move in the X axis direction, and a servo motor (not shown in the figure) as a drive source for moving the table 36b in the X axis direction. In the work moving device 36, the movement of the table 36b and the work W carried on the table 36b in the X axis direction is NC controlled by a drive control of the servo motor.

Further, in the tool machine 32, a pair of columns 41, 41 are provided vertically on both sides in the lateral direction of the bed 36a, and a cross rail 43 is provided on the columns 41, 41 so that the cross rail could be guided in the vertical direction. The tool moving device 40 is mounted on the cross rail 43. The tool moving device 40 is provided with a spindle device 40a that is supported on the cross rail 43 so that the spindle device can move in the Y axis direction and a servo motor (not shown in the figure) serving as a drive source for moving the spindle device 40a in the Y axis direction. The spindle device 40a supports a tool 38 and rotates the tool 38 about an axis perpendicular to the upper surface of the table 36b. In the tool moving device 40, the movement in the Y axis direction of the spindle device 40a and the tool 38 rotated by the spindle device 40a is NC controlled by a drive control of the servo motor. Machining of the work W into a predetermined shape is performed by the tool 38, while rotating the tool 38, by simultaneously controlling the movement of the tool 38 in the Y axis direction by the tool moving device 40 and the movement of the work W in the X axis direction by the work moving device 36. Further, in the tool machine 32, the acceleration-deceleration time constant of the movement of the work W in the X axis direction caused by the work moving device 36 and the acceleration-deceleration time constant of the movement of the tool 38 in the Y axis direction caused by the tool moving device 40 are set to the same value.

The numerical control device 34 according to the second embodiment controls the drive of the work moving device 36 and the drive of the tool moving device 40 in the above-described tool machine 32. By contrast with the first embodiment, the movement of the work W in the X axis direction and the movement of the tool 38 in the Y axis direction are controlled. As shown in FIG.

9, the numerical control device 34 has a tertiary distribution pulse calculation unit 44.

The tertiary distribution pulse calculation unit 44 calculates with respect to each of the X axis direction and Y axis direction a distribution error corresponding to a difference between a primary distribution position for each of the calculation cycles in the X axis direction and Y axis direction in the case in which movement is performed according to the primary distribution pulses calculated by the primary distribution pulse calculation unit 18 and a secondary distribution position for each of the calculation cycles in the X axis direction and Y axis direction in the case in which movement is performed according to the secondary distribution pulses calculated by the secondary distribution pulse calculation unit 20. Further, the tertiary distribution pulse calculation unit 44 corrects the secondary distribution positions in the X axis direction and Y axis direction on the basis of distribution errors of the corresponding directions and calculates the tertiary distribution pulse, which is a movement amount of each of the calculation cycles, from the correction results for each of the X axis direction and Y axis direction.

More specifically, the tertiary distribution pulse calculation unit 44 has a distribution error calculation unit 46, an error correction pulse calculation unit 48, and a distribution error correction unit 50.

The distribution error calculation unit 46 calculates a primary distribution position for each of the calculation cycles in the X axis direction and Y axis direction in the case in which movement is performed according to the primary distribution pulses and calculates a secondary distribution position for each of the calculation cycles in the X axis direction and Y axis direction in the case in which movement is performed according to the secondary distribution pulses. Further, the distribution error calculation unit 46 calculates a distribution error for each of the X axis direction and Y axis direction by calculating a difference between these two calculated distribution positions.

The error correction pulse calculation unit 48 calculates an error correction pulse for each of the X axis direction and Y axis direction by using a slow variation portion that has small variations as is, and performing an adjustment such that variations in a rapid variation portion that has large variations are relaxed, within the distribution error in the X axis direction and Y axis direction calculated by the distribution error calculation unit 46.

The distribution error correction unit 50 subtracts error correction pulses in the X axis direction and Y axis direction calculated by the error correction pulse calculation unit 48 from the secondary distribution position in the X axis direction and Y axis direction calculated by the distribution error calculation unit 46 and thereby calculates a tertiary distribution position for each of the X axis direction and Y axis direction. Further, the distribution error correction unit 50 calculates tertiary distribution pulses, which are movement amounts for each of the calculation cycles, with respect to each of the X axis direction and Y axis direction from the calculated tertiary distribution positions.

In the second embodiment the drive control unit 22 drives the work moving device 36 on the basis of the tertiary distribution pulses of the X axis direction calculated by the distribution error correction unit 50 and drives the tool moving device 40 on the basis of the tertiary distribution pulses of the Y axis direction calculated by the distribution error correction unit 50. More specifically, the drive control unit 22 outputs the calculated tertiary distribution pulses of each of the calculation cycles in the X axis direction to the servo motor 36c of the work moving device 36 and outputs the calculated tertiary distribution pulses of each of the calculation cycles in the Y axis direction to the servo motor 40c of the tool moving device 40. As a result, the work moving device 36 moves the table 36b together with the work W in the X axis direction by the movement amount for each of the calculation cycles corresponding to the received tertiary distribution pulses. The tool drive device 40 moves the spindle device 40a together with the tool 38 in the Y axis direction by the movement amount for each of the calculation cycles corresponding to the received tertiary distribution pulses.

Other basic features of the numerical control device 34 according to the second embodiment are similar to those of the numerical control device 4 according to the first embodiment.

Figure 10:
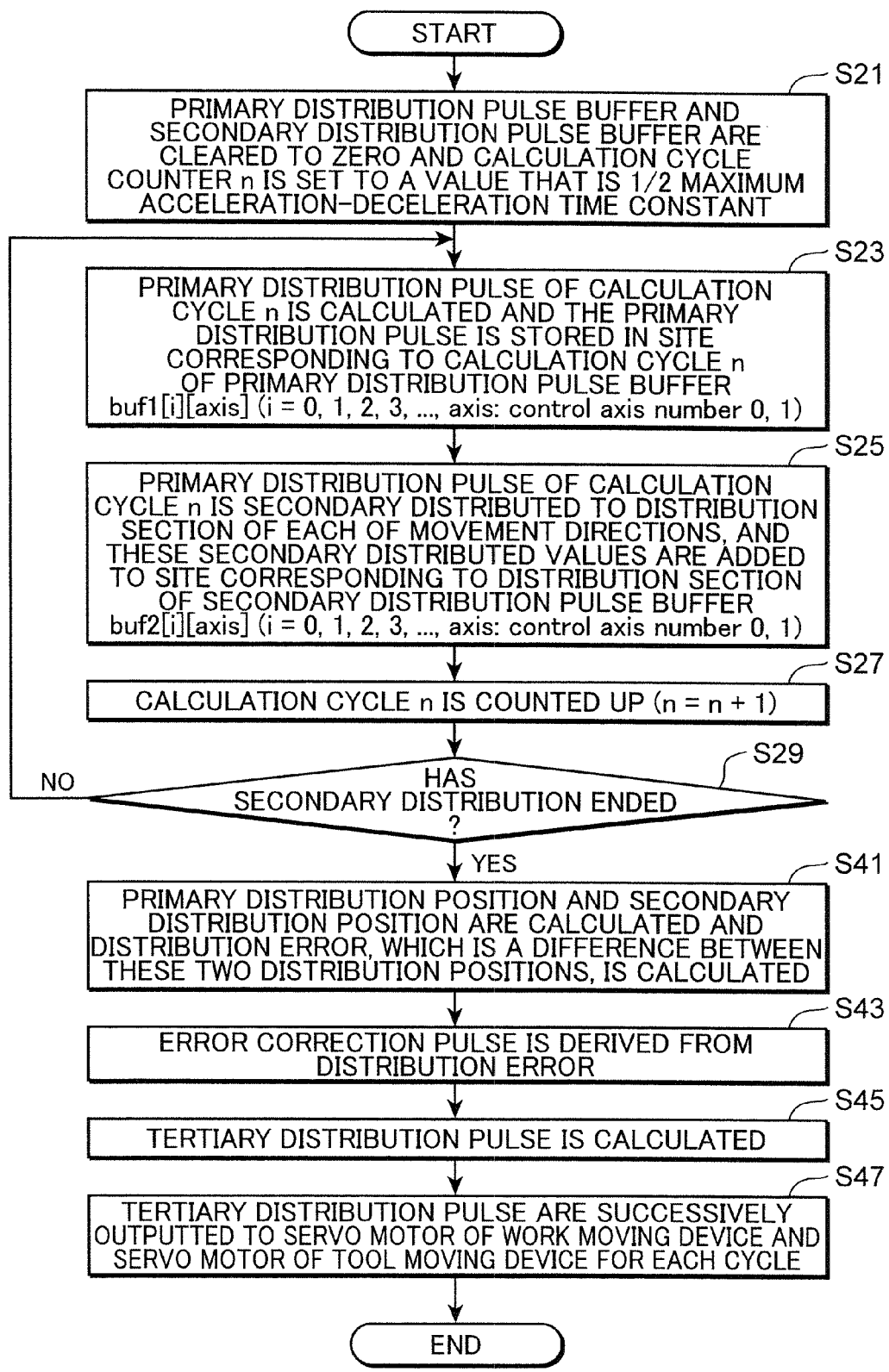
FIG. 10 is a flowchart illustrating a numerical control process in the numerical control device of the second embodiment.
Figure 11:
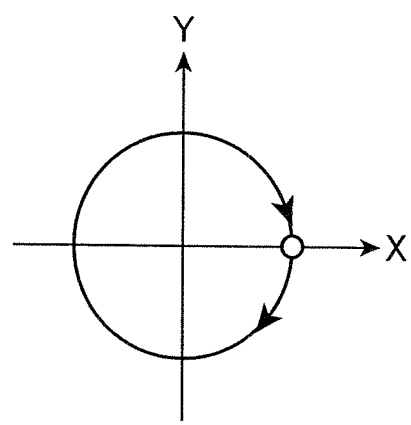
FIG. 11 shows a trajectory of machining according to a NC program in the second embodiment.
Figure 14A:
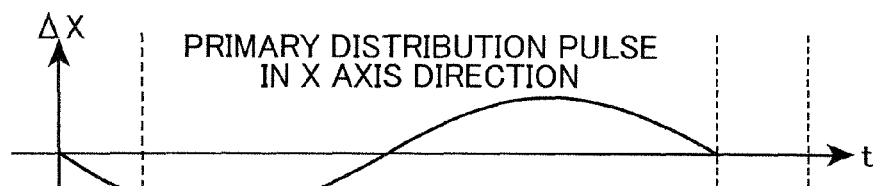
FIG. 14 illustrates primary distribution pulses, secondary distribution pulses, primary distribution position, secondary distribution position, and distribution error in the X axis direction in the comparative example.
Figure 14B:
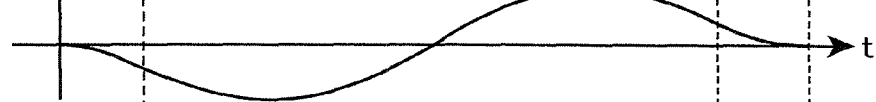
Figure 14C:
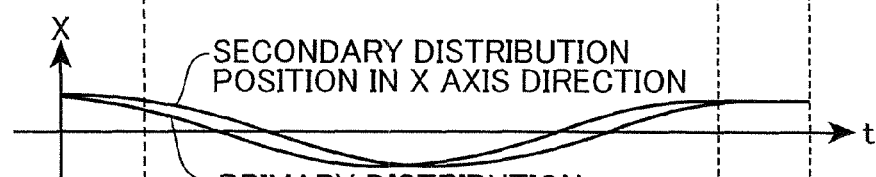
Figure 14D:
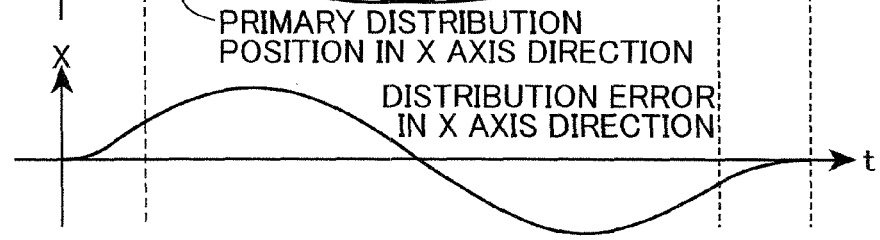

FIG. 10 is a flowchart illustrating a process of numerical control in the numerical control device 34 according to the second embodiment. The process of numerical control in the numerical control device 34 according to the second embodiment will be described below. Here, the case is explained by way of example in which the work W is machined in a round fashion as shown in FIG. 11 by simultaneously moving the work W in the X axis direction by the work moving device 36 and moving the tool 38 in the Y axis direction by the tool moving device 40.

In the numerical control performed by the numerical control device 34 according to the second embodiment, the processing of steps S21 to S29 is carried out in the same manner as in the first embodiment. However, in the primary distribution pulse buffer buf1[$i$][axis] and secondary distribution pulse buffer buf2[$i$][axis], the control axis number "axis" becomes 0, 1 that correspond to the X axis direction and Y axis direction. In the second embodiment, the primary distribution pulse in the X axis direction calculated by the primary distribution pulse calculation unit 18 is a curve such as shown in FIG. 12A, and the secondary distribution pulse in the X axis direction calculated by the secondary distribution pulse calculation unit 20 is a curve such as shown in FIG. 12B. Further, the primary distribution pulse in the Y axis direction calculated by the primary distribution pulse calculation unit 18 is a curve such as shown in FIG. 13A, and the secondary distribution pulse in the Y axis direction calculated by the secondary distribution pulse calculation unit 20 is a curve such as shown in FIG. 13B.

When it is determined that the secondary distribution of the primary distribution pulses of all of the calculation cycles has ended in the determination of the step S29 as to whether the secondary distribution has ended, the distribution error calculation unit 46 of the tertiary distribution pulse calculation unit 44 calculates a primary distribution position in the case of movement according to the primary distribution pulses, calculates a secondary distribution position in the case of movement according to the secondary distribution pulses, and also calculates a distribution error, which is a difference between the two calculated distribution positions (step S41).

More specifically, the distribution error calculation unit 46 calculates a primary distribution position corresponding to an end point position of the primary distribution pulse in each of the calculation cycles for each axis direction. The primary distribution position is calculated by accumulating primary distribution pulses buf1[0][axis], buf1[1][axis], buf1[2][axis], . . . , stored in the primary distribution pulse buffer of the data storage unit 19 and is buf1[0][axis], buf1[0][axis]+buf1[1][axis], buf1[0][axis]+buf1[1][axis]+buf1[2][axis], . . . .

The distribution error calculation unit 46 calculates a secondary distribution position corresponding to an end point position of the secondary distribution pulse in each of the calculation cycles for each axis direction. The secondary distribution position is calculated by accumulating values for each of the cycles that have been added to the secondary distribution pulse buffer of the data storage unit 19 and stored therein and is buf2[0][axis], buf2[0][axis]+buf2[1][axis], buf2[0][axis]+buf2[1][axis]+buf2[2][axis], . . . .

The distribution error calculation unit 46 then calculates a distribution error of each cycle for each of the axis directions by subtracting the primary distribution position from the secondary distribution position in each of the cycles. The distribution error in the X axis direction that is thus calculated is a curve such as shown in FIG. 12D, and a distribution error in the Y direction is a curve such as shown in FIG. 13D. In FIG. 12D, the ordinate is enlarged by comparison with that in FIGS. 12A to 12C, and in FIG. 13D, the ordinate is enlarged by comparison with that in FIGS. 13A to 13C. The enlargement ratio of the ordinates in FIGS. 12D and FIG. 13D is the same.

With the technique according to the comparative example in which the primary distribution pulses of each of the calculation cycles are secondary distributed only in a distribution section following the corresponding calculation cycle, the difference between the primary distribution position and the secondary distribution position in both the X axis direction and the Y axis direction is increased, as shown in FIG. 14 and FIG. 15 over that obtained with the technique of the second embodiment. As a result, in the comparative example, the calculated distribution error in the X axis direction and Y axis direction is substantially larger than that in the second embodiment. This is because the secondary distribution position lags (phase lag) with respect to the primary distribution position due to a type of the secondary distribution in the comparative example according to which the primary distribution pulses of each of the calculation cycles are distributed only in a distribution section following the corresponding calculation cycle, and this phase lag is included in the distribution error. Further, the distribution error includes a combination of the phase lag and the actual distribution error and the two cannot be separated.

By contrast, in the secondary distribution position in the X axis direction and Y axis direction calculated by the method according to the present embodiment, the phase lag is eliminated at the point of time at which the movement speeds reach a constant equal speed. Therefore, the distribution error calculated by the distribution error calculation unit 46 does not include the phase lag. Thus, the distribution error includes only the actual distribution error from which the effect of phase lag has been removed.

The error correction pulse calculation unit 48 derives an error correction pulse for each of the axis directions by using a slow variation portion that has small variations as is, and performing an adjustment such that variations in a rapid variation portion that has large variations are relaxed, within the distribution error calculated by the distribution error calculation unit 46 (step S43).

In this case, the error correction pulse calculation unit 48 determines the slow variation portion and the rapid variation portion within the distribution error by the predetermined determination method. More specifically, the error correction pulse calculation unit 48 determines as a rapid variation portion a portion corresponding to a calculation cycle in which a variation ratio of the distribution error exceeds a predetermined threshold on the basis of a variation ratio of the distribution error calculated by the distribution error calculation unit 46 and determines other portion as a slow variation portion. The rapid variation portion is a portion in which rapid acceleration and deceleration are designated by the NC program and which includes an effect of relaxing these acceleration-deceleration variations by the secondary distribution. The slow variation portion is a portion showing an unintended distribution error occurring due to the secondary distribution of the primary distribution pulses. The distribution error obtained by the secondary distribution according to the comparative example such as shown in FIG. 14 and FIG. 15 includes the phase lag, as described hereinabove, and therefore the rapid variation portion and slow variation portion are difficult to distinguish from each other. However, in the present embodiment, the distribution error does not include the phase lag and therefore the rapid variation portion and slow variation portion can be distinguished from each other.

The error correction pulse calculation unit 48 performs a correction of relaxing the variations in the rapid variation portion by conducting proportional allocation to connect a value of the start point to the value of the end point of the rapid variation portion in a section from the start point to the end point of the rapid variation portion. In such a manner, an error correction pulse in the X axis direction such as shown in FIG. 12E and an error correction pulse in the Y axis direction such as shown in FIG. 13E are derived. In FIG. 12E and FIG. 13E, the ordinates are enlarged with respect to those of FIGS. 12A to 12C and FIGS. 13A to 13C at the same enlargement ratio as in FIG. 12D and FIG. 13D. The correction that relaxes the variations of the rapid variation portion is performed so that the acceleration-deceleration relaxation effect produced by the above-described secondary distribution remains in the tertiary distribution position that is subsequently derived by subtracting the error correction pulse from the secondary distribution position and the tertiary distribution pulse derived from this tertiary distribution position.

The distribution error correction unit 50 calculates the tertiary distribution position for each other axis direction by subtracting the error correction pulse of the corresponding cycle that is derived by the error correction pulse calculation unit 48 from the secondary distribution position of each of the cycles calculated by the distribution error calculation unit 46. The distribution error correction unit 50 then calculates the tertiary distribution pulses as movement amounts of each of the cycles from the calculated tertiary distribution position with respect to each of the axis directions (step S45).

The drive control unit 22 then successively outputs the tertiary distribution pulses for each cycle to the servo motor 36c of the work moving device 36 and the servo motor 40c of the tool moving device 40 (step S47). As a result, the work moving device 36 and the tool moving device 40 are driven according to the tertiary distribution pulses for each axis direction. Therefore, the work W moves in the X axis direction and the tool 38 moves in the Y axis direction. As a result, circular cutting is performed on the work W.

Figure 16:
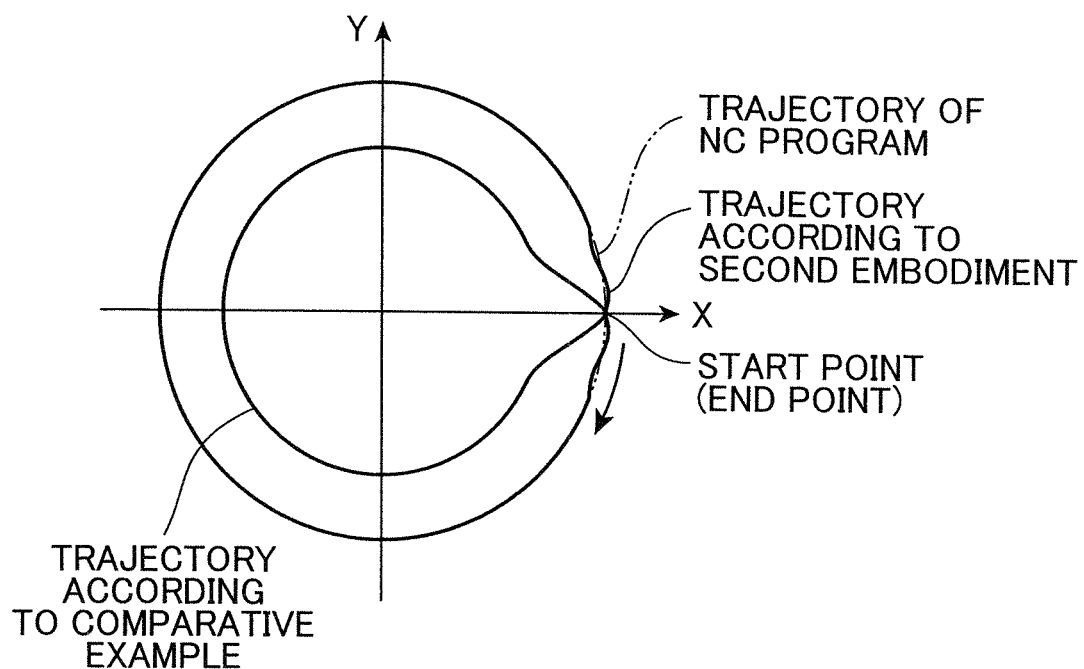
FIG. 16 shows a machining trajectory in the second embodiment and a machining trajectory in the comparative example.

The circular trajectory in this case has a shape such as shown in FIG. 16. As follows from FIG. 16, a slight error of the trajectory of machining performed in the second embodiment with respect to the trajectory of the NC program occurs only during acceleration and deceleration in the vicinity of the start point and end potion. Absolutely no error occurs in other portions. By contrast, in the machining trajectory obtained in the comparative example, an internal rotation error with respect to the trajectory of the NC program occurs immediately after the movement has started from the start point, this internal rotation error is maintained thereafter at a constant level, and the internal rotation error is eliminated in the vicinity of the end point. This comparison with the comparative example demonstrates that the technique according to the second embodiment is effective in eliminating the internal rotation error.

As described hereinabove, in the numerical control device 34 of the second embodiment, the secondary distribution pulse calculation unit 20 calculates the secondary distribution pulses while adjusting the position of the distribution section so that the distribution amount of the primary distribution pulses in a range from the start point of the distribution section to the corresponding calculation cycle and the distribution amount of the primary distribution pulses in the range from the corresponding calculation cycle to the end point of the distribution section become equal to each other. For this reason, in the second embodiment, similarly to the first embodiment, the secondary distribution position can be matched with the primary distribution position in each of the X axis direction and the Y axis direction at the point of time at which the movement speed in the X axis direction and the movement speed in the Y axis direction reach a constant equal speed. As a result, a phase lag of the secondary distribution position with respect to the primary distribution position can be prevented from being included in the distribution error, which is the difference between the primary distribution position and the secondary distribution position. Thus, only the actual distribution error from which the effect of the phase lag has been removed can be obtained as the distribution error. As a result, in the tertiary distribution position determined by correcting the secondary distribution position on the basis of the distribution error, the actual distribution error fraction can be selectively corrected, while eliminating the effect of the error caused by the phase lag. Therefore, in the tertiary distribution pulse derived from the tertiary distribution position after the correction, the effect of the internal rotation error caused by the actual distribution error can be effectively eliminated. As a result, in the movement performed according to the tertiary distribution pulses in the X axis direction and Y axis direction, the internal rotation error with respect to the machining path of the NC program can be inhibited. Therefore, the machining error of the work W can be reduced and machining accuracy of the work W can be increased.

In the second embodiment, an error caused by the phase lag is eliminated from the distribution error calculated as a difference between the primary distribution position and the secondary distribution position, and only the actual distribution error is demonstrated. Therefore, the aforementioned slow variation portion and rapid variation portion can be distinguished from each other in the distribution error. The rapid variation portion is a portion including an effect of relaxing by secondary distribution the speed variations in the portion in which rapid acceleration and deceleration are designated by the NC program. Therefore, when an error correction pulse is calculated with the error correction pulse calculation unit 48, the error correction pulse can be derived by performing an adjustment such that variations of the rapid variation portion in the distribution error are relaxed. For this reason, in the tertiary distribution pulses further derived from the tertiary distribution position calculated by subtracting the error correction pulse from the secondary distribution position, the acceleration-deceleration relaxation effect produced by the secondary distribution can be effectively maintained. Meanwhile, the slow variation portion indicates an unintended distribution error occurring due to the secondary distribution of the primary distribution pulses. Therefore, where the slow variation portion is used as is to derive an error correction pulse, it is possible to calculate the tertiary distribution position by subtracting the error correction pulse from the secondary distribution position and eliminate the effect of the unintended distribution error with the tertiary distribution pulses derived from the tertiary distribution position.

All the features described in the embodiments disclosed herein should be construed as exemplary rather than limiting. The scope of the present invention is represent by the appended claims, rather than by the description of the embodiments and includes all the variations within the equivalent meaning and scope of the claims.

For example, the present invention can be applied to various tool machines other than the tool machines 2, 32 describes by way of example in the embodiments. Further, the present invention can be applied not only to the relationship between the tool movement and work movement, but also to the relationship between a plurality of movement directions of the tool itself, the relationship between a plurality of movement directions of the work itself, and the relationship between other dissimilar movement directions.

The secondary distribution pulse calculation unit 20 may have a recursive function of taking the secondary distribution pulses, which have been calculated by the secondary distribution of the primary distribution pulses, anew as primary distribution pulses and calculating the secondary distribution pulses by performing the secondary distribution again.

Figure 17:
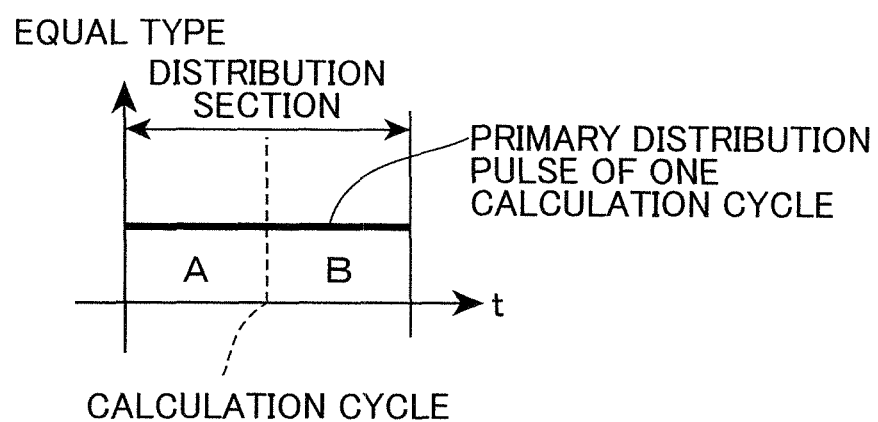
FIG. 17 illustrates an equalization-type secondary distribution method.
Figure 18:
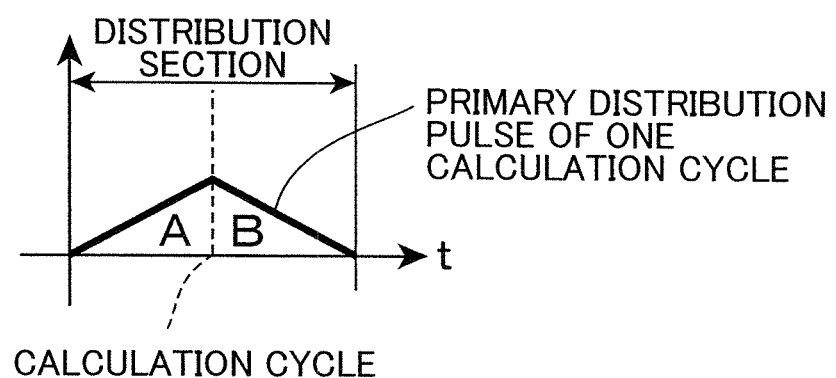
FIG. 18 illustrates a triangle-type secondary distribution method.
Figure 19:
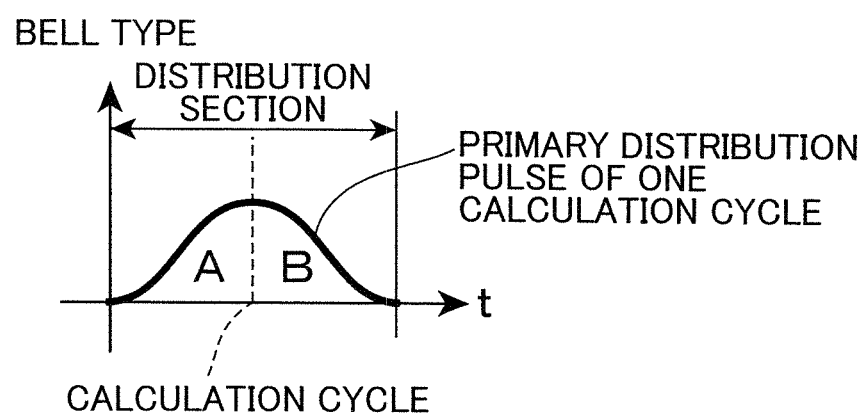
FIG. 19 illustrates a bell-type secondary distribution method.
Figure 20:
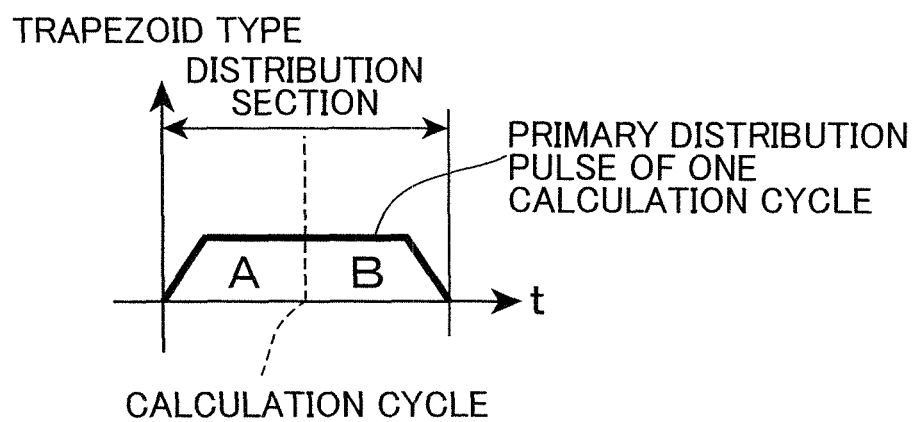
FIG. 20 illustrates a trapezoid-type secondary distribution method.

Further, the secondary distribution method used by the secondary distribution pulse calculation unit 20 is not limited to an equal-type method by which the primary distribution pulses are distributed equally within the range of the distribution section, as in the above-described embodiments. For example, FIG. 17 illustrates the equal-type secondary distribution method, but various other secondary distribution methods such that equalize the distribution amount on the front side (area of the portion A in the figure) and the distribution amount on the rear side (area of the portion B in the figure) in the range of the distribution section, the calculation cycle serving as a boundary, may be also used. Examples of such other methods include the triangle-type secondary distribution method illustrated by FIG. 18, bell-type secondary distribution method illustrated by FIG. 19 and the trapezoid-type secondary distribution method such as shown in FIG. 20.

Further, a method for determining a slow variation portion and a rapid variation portion of the distribution error is not limited to the determination method used in the embodiments. For example, a determination method may be used by which a calculation cycle in which the variation amount within the primary distribution pulse exceeds a predetermined threshold is distinguished, this calculation cycle is taken as a center for forward and rearward spread, a portion having a section width corresponding to the corresponding acceleration-deceleration time constant is taken as a rapid variation portion, and the remaining portion is taken as the slow variation portion.

Further, when secondary distribution of primary distribution pulses is performed in the configuration according to the first embodiment, where the primary distribution pulses are distributed before and after calculation cycles corresponding to the primary distribution pulses within a range of a distribution section across the corresponding calculation cycles and having the acceleration-deceleration time constant of the corresponding movement direction as a section width, it is not necessary that a distribution amount of the primary distribution pulses in a range from a start point of the distribution section to the calculation cycle and a distribution amount of the primary distribution pulses in a range from the calculation cycle to an end point of the distribution section will be made equal to each other.

Further, when secondary distribution of primary distribution pulses is performed in the configuration according to the second embodiment, a distribution amount of the primary distribution pulses in a range from a start point of the distribution section to the calculation cycle and a distribution amount of the primary distribution pulses in a range from the calculation cycle to an end point of the distribution section may be substantially equal to each other, rather than perfectly equal to each other.

Further, where the NC program causes continuous execution of a plurality of fine linear movements and when the primary distribution pulse of the predetermined calculation cycle includes a start point or an end point of the linear movement, the primary distribution pulse calculation unit 18 may identify a calculation cycle corresponding to this primary distribution pulse as a calculation cycle corresponding to the slow variation portion, but when the primary distribution pulse of the predetermined calculation cycle includes neither the start point nor the end point of the linear movement, the primary distribution pulse calculation unit may identify a calculation cycle corresponding to the primary distribution pulse as a calculation cycle corresponding to the rapid variation portion.

Figure 21:
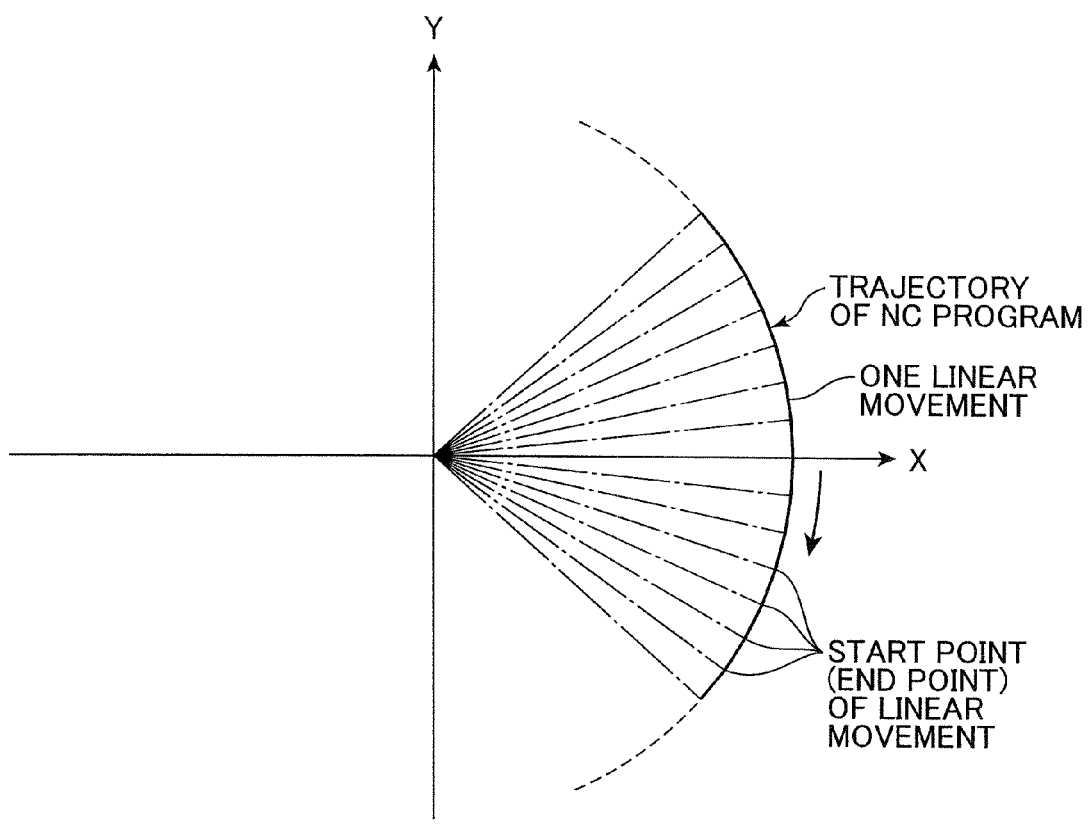
FIG. 21 illustrates a trajectory of machining according to a NC program of a variation example of the second embodiment. h
Figure 22A:
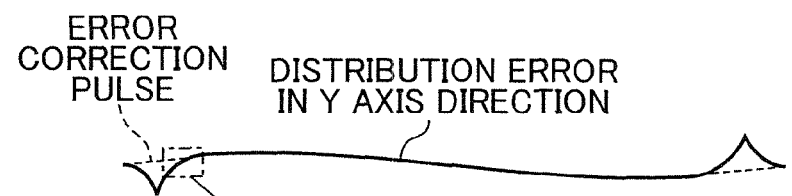
FIG. 22 illustrates a distribution error in the Y axis direction in the variation example of the second embodiment.
Figure 22B:
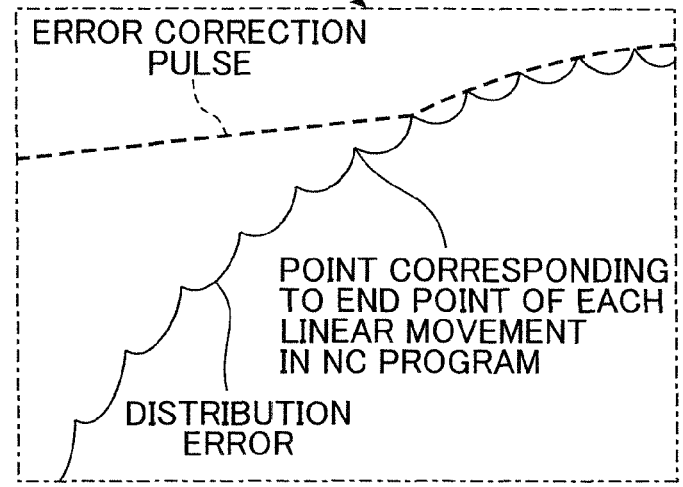

More specifically, when the NC program designates a trajectory obtained by linearly dividing the circular trajectory shown in the second embodiment at a predetermined pitch angle, as in the variation example shown in FIG. 21, the distribution error calculated by the distribution error calculation unit 46 is analogous to the distribution error (see FIG. 13D) obtained in the second embodiment, when viewed as a whole in FIG. 22A, but when viewed on the enlarged scale, the distribution error demonstrates fine peaks and valleys, as shown in FIG. 22B. In FIG. 22, only the distribution error in the Y axis direction is shown. These peaks and valleys are present in the distribution error because when a plurality of fine linear movements are continuously performed, the primary distribution pulses have a step-like shape and therefore stepwise variations of the primary distribution pulses are changed by the secondary distribution into slow variations.

Further, in the variation example, the primary distribution pulse calculation unit 18 determines whether the trajectory designated by the NC program represents the continuous execution of fine linear movements. When the primary distribution pulse calculation unit 18 determines that the trajectory designated by the NC program represents the continuous execution of fine linear movements, information indicating the calculation cycle corresponding to the slow variation portion is added to the calculation cycle of the primary distribution pulse including the end point of each linear movement of the NC program when the primary distribution pulse is calculated, and no such information is added to the calculation cycles of other primary distribution pulses. When the error correction pulse calculation unit 48 then derives an error correction pulse from the distribution error, the slow variation portion and rapid variation portion of the distribution error in each of the linear movements is determined on the basis of this information added to the calculation cycle, while similarly performing a processing (the aforementioned step S43) of relaxing the variations of the rapid variation portion in the entire distribution error explained in the second embodiment. The error correction pulse calculation unit 48 then derives the error correction pulse by using the slow variation portion of the distribution error in each of the linear movements as is, and performing an adjustment to relax the variations of the rapid variation portion of the distribution error in each of linear movement. As a result, the determined error correction pulse is corrected so that the variations in the rapid variation portion of the entire distribution error are relaxed, as shown in FIG. 22B, and represents a curve that has been corrected so as to pass through the points corresponding to the end points of the linear movements in the distribution error and smoothly connect these points.

Where the tertiary distribution position is derived by subtracting the error correction pulse from the secondary distribution position in the same manner as in the second embodiment and the tertiary distribution pulse is derived from the tertiary distribution position, the movement according to the third distribution pulse will be a smooth motion passing through the end points of the linear movements and taking over the relaxation effect of the secondary distribution in the intermediate portion of each linear movement. This motion will be eventually identical to that in the case of curve correction such that smoothly connects the end points of linear movement of the NC program.

Thus, in this variation example, when the primary distribution pulse of the predetermined calculation cycle includes an end point of the linear movement, in the calculation cycle corresponding to this primary distribution pulse, the tertiary distribution position is derived by subtracting the distribution error as is from the secondary distribution position. By contrast, when the primary distribution pulse of the predetermined calculation cycle does not include an end point of the linear movement, in the calculation cycle corresponding to the primary distribution pulse, the third distribution position is derived by subtracting from the secondary distribution position a value obtained by performing an adjustment such that relaxes the variations of the distribution error. Therefore, in the trajectory of movement performed according to the tertiary distribution pulse thereafter derived from each derived tertiary distribution position, the position of each end point of the NC program is maintained, in the intermediate portions of linear movements positioned between the end points, the effect of changing stepwise variations of the primary distribution pulses into relaxed variations by the secondary distribution will be taken over and thereby a trajectory will be obtained in which the end points are connected smoothly by a curve. As a result, the motion in which a plurality of fine linear movements of the NC program are performed continuously can be corrected into a smooth curved motion.

[Summary of Embodiments]

The above-described embodiments are summarized below.

The numerical control device for a tool machine according to the embodiment is provided at a tool machine which has a work moving device that moves a work in at least one movement direction and a tool moving device that moves a tool for machining the work in at least one movement direction, in which the movement direction of the work or the movement direction of the tool includes a first movement direction and/or a second movement direction that are different from each other, and in which an acceleration-deceleration time constant of the movement in the first movement direction and an acceleration-deceleration time constant of the movement in the second movement direction are set to mutually different values, the numerical control device serving to control a drive of at least one of the work moving device and the tool moving device, and comprising: a primary distribution pulse calculation unit that calculates primary distribution pulses obtained by distributing individually a movement amount in the first movement direction included in a movement command of the work or a movement command of the tool and a movement amount in the second movement direction included in a movement command of the work or a movement command of the tool for each of predetermined calculation cycles; a secondary distribution pulse calculation unit that calculates, for each of the first movement direction and the second movement direction, secondary distribution pulses obtained by distributing the primary distribution pulses of each of the predetermined calculation cycles, which have been calculated by the primary distribution pulse calculation unit, before and after corresponding calculation cycles within ranges of distribution sections across the corresponding calculation cycles and having the acceleration-deceleration time constant of the corresponding movement direction as a section width, and then accumulating the primary distribution pulses for each of the calculation cycles; and a drive control unit that drives at least one of the tool moving device and the work moving device on the basis of the secondary distribution pulses calculated by the secondary distribution pulse calculation unit.

With such a numerical control device for a tool machine, the secondary distribution pulse calculation unit calculates for each of the first movement direction and the second movement direction secondary distribution pulses obtained by distributing the primary distribution pulses of each of the predetermined calculation cycles before and after corresponding calculation cycles within ranges of distribution sections across the corresponding calculation cycles and having the acceleration-deceleration time constant of the corresponding movement direction as a section width, and then accumulating the primary distribution pulses for each of the calculation cycles. Therefore, the secondary distribution position corresponding to a position in the case of movement according to the secondary distribution pulses can be brought closer to the primary distribution position corresponding to a position in the case in which the movement has been performed at a constant and equal speed from the very first calculation cycle, that is, to a position in the case of movement according to the primary distribution pulses, at the point of time at which a constant speed has been reached by acceleration after the movement started in each of the first movement direction and the second movement direction than in the case in which the secondary distribution pulses are derived by distributing the primary distribution pulses only to a distribution section after the corresponding calculation cycle. In other words, at the point of time at which the movement in all of the movement directions has reached a constant speed, the second distribution position in each corresponding movement direction can be brought close to the primary distribution position in the first movement direction and the primary distribution position in the second movement direction, without a phase error therebetween. Therefore, at this point of time, an error between the secondary distribution positions in the two movement directions can be eliminated. As a result, the machining error of the work can be reduced. Therefore, in the numerical control device for a tool machine, the machining accuracy of the work can be increased in the case in which the movement directions of a work and a tool include different movement directions.

It is preferred that in the numerical control device for a tool machine, the secondary distribution pulse calculation unit performs the calculation of the secondary distribution pulses while adjusting a position of the distribution section so as to equalize a distribution amount of the primary distribution pulses in a range from a start point of the distribution section to the corresponding calculation cycle and a distribution amount of the primary distribution pulses in a range from the corresponding calculation cycle to an end point of the distribution section.

With such a configuration, the secondary distribution position can be matched with the primary distribution position at the point of time at which a constant speed has been reached by acceleration after the movement started on the basis of at least an equal speed movement command in each of the first movement direction and the second movement direction. Therefore, an error between the secondary distribution positions in both movement directions can be completely eliminated at the point of time at which a constant speed has been reached by acceleration. On the basis of other movement commands, for example, a movement command accompanied by a speed change, the secondary distribution position can be brought closer to the primary distribution position at the point of time at which a constant speed has been reached by acceleration after the movement started than in the case in which the primary distribution pulses are distributed before and after corresponding calculation cycles in a distribution section across the corresponding calculation cycles, but the distribution amounts of the primary distribution pulses before and after the calculation cycles are not equal to each other. As a result, an error between the secondary distribution positions in both movement directions can be further reduced at the point of time at which a constant speed has been reached by acceleration. Therefore, with such a configuration, the machining accuracy of the work by the tool machine can be further increased.

The numerical control device for a tool machine according to the embodiments is provided at a tool machine which has a work moving device that moves a work in at least one movement direction and a tool moving device that moves a tool for machining the work in at least one movement direction, and in which the movement direction of the work or the movement direction of the tool includes a first movement direction and/or a second movement direction that are different from each other, the numerical control device serving to control a drive of at least one of the work moving device and the tool moving device, and comprising: a primary distribution pulse calculation unit that calculates primary distribution pulses obtained by distributing individually a movement amount in the first movement direction included in a movement command of the work or a movement command of the tool and a movement amount in the second movement direction included in a movement command of the work or a movement command of the tool for each of predetermined calculation cycles; a secondary distribution pulse calculation unit that calculates, for each of the first movement direction and the second movement direction, secondary distribution pulses obtained by distributing the primary distribution pulses of each of the predetermined calculation cycles, which have been calculated by the primary distribution pulse calculation unit, within ranges of distribution sections across corresponding calculation cycles and having an acceleration-deceleration time constant of the corresponding movement direction as a section width, and then accumulating the primary distribution pulses for each of the calculation cycles, and performs the calculation of the secondary distribution pulses while adjusting a position of the distribution section so as to equalize a distribution amount of the primary distribution pulses in a range from a start point of the distribution section to the corresponding calculation cycle and a distribution amount of the primary distribution pulses in a range from the corresponding calculation cycle to an end point of the distribution section; a tertiary distribution pulse calculation unit that calculates, for each of the first movement direction and the second movement direction, a distribution error which is a difference between a primary distribution position corresponding to a position for each of the calculation cycles in the case of movement according to the primary distribution pulses and a secondary distribution position corresponding to a position for each of the calculation cycles in the case of movement according to the secondary distribution pulses, corrects the secondary distribution position on the basis of the calculated distribution error, and calculates, for each of the first movement direction and the second movement direction, tertiary distribution pulses which are the movement amounts of each of the calculation cycles, from a result of the correction; and a drive control unit that drives at least one of the work moving device and the tool moving device on the basis of the tertiary distribution pulses calculated by the tertiary distribution pulse calculation unit.

With such numerical control device for a tool machine, the secondary distribution pulse calculation unit performs the calculation of the secondary distribution pulses while adjusting a position of the distribution section so as to equalize a distribution amount of the primary distribution pulses in a range from a start point of the distribution section to the corresponding calculation cycle and a distribution amount of the primary distribution pulses in a range from the corresponding calculation cycle to an end point of the distribution section. Therefore, a phase lag of the secondary distribution position with respect to the primary distribution position can be eliminated. As a result, the distribution error, which is a difference between the primary distribution position and the secondary distribution position, can be obtained such that includes only the actual distribution error from which the effect of phase lag has been removed. Therefore, in the movement performed according to the tertiary distribution pulses calculated from the results obtained by correcting the secondary distribution position on the basis of the distribution error, an inner rotation error caused by the actual distribution error can be eliminated.

In the conventional configuration in which the primary distribution pulses are secondary distributed only in a distribution section following the corresponding calculation cycle to calculate the secondary distribution pulses, a phase lag occurs in the secondary distribution position when movement is performed according to the secondary distribution pulses with respect to the primary distribution position when movement is performed according to the primary distribution pulses due to such type of secondary distribution. Therefore, in such configuration, the difference between the primary distribution position and the secondary distribution position includes a combination of the actual distribution error and the phase lag and the two cannot be separated. As a result, although the secondary distribution position is corrected on the basis of the distribution error, which is the difference between the primary distribution position and the secondary distribution position, and tertiary distribution pulses are derived on the basis of the correction results, it is impossible to derive the tertiary distribution pulses from which only the element of inner rotation error caused by the actual distribution error has been removed.

By contrast, in the numerical control device for a tool machine according to the embodiment, the phase lag of the secondary distribution position with respect to the primary distribution position can be eliminated due to the above-described type of secondary distribution and therefore the phase lag is not included in the distribution error, which is a difference between the primary distribution position and the secondary distribution position. Thus, the distribution error can be obtained such that includes only the actual distribution error. Therefore, when the secondary distribution position is corrected on the basis of the distribution error, the secondary distribution position can be corrected by the actual distribution error, while eliminating the effect of the error caused by the phase lag. Consequently, in the tertiary distribution pulses derived from the results obtained after correction, the element of inner rotation error occurring due to the actual distribution error can be effectively eliminated. As a result, in the movement according to the tertiary distribution pulses, inner rotation errors can be eliminated. Therefore, in this numerical control device for a tool machine, the work machining accuracy can be increased when the movement directions of the work and the tool include different movement directions.

In this case the tertiary distribution pulse calculation unit preferably includes: a distribution error calculation unit that calculates the distribution error by calculating the primary distribution position on the basis of the primary distribution pulses, calculating the secondary distribution position on the basis of the secondary distribution pulses, and calculating a difference between these two calculated distribution positions; an error correction pulse calculation unit that calculates an error correction pulse by using, within the distribution error calculated by the distribution error calculation unit, a slow variation portion that has small variations as is, and adjusting a rapid variation portion that has large variations such that variations thereof are relaxed; and a distribution error correction unit that calculates a tertiary distribution position by subtracting the error correction pulse calculated by the error correction pulse calculation unit from the secondary distribution position calculated by the distribution error calculation unit and calculates the tertiary distribution pulses from the calculated tertiary distribution position.

With such a configuration it is possible to obtain a specific structure of the tertiary distribution pulse calculation unit that can calculate tertiary distribution pulses from which the phase lag element has been eliminated from the secondary distribution pulses. Further, with such a configuration, since the distribution error, which is a difference between the primary distribution position and the secondary distribution position, includes only the actual distribution error, without including the phase lag, it is possible to distinguish between the slow variation portion and the rapid variation portion in the distribution error, without being impeded by the phase lag. The rapid variation portion includes an effect of acceleration-deceleration relaxation induced by the secondary distribution with respect to a portion for which an abrupt acceleration-deceleration has been designated in the movement command. Therefore, where the error correction pulse is derived by performing an adjustment to relax the variation of the rapid variation portion, within the distribution error, when the error correction pulse is calculated by the error correction pulse calculation unit, it is possible to calculate the tertiary distribution position by subtracting the error correction pulse from the secondary distribution position and maintain the relaxation effect of abrupt acceleration-deceleration in the movement command attained due to the secondary distribution with the tertiary distribution pulses derived from the tertiary distribution position. Meanwhile, the slow variation portion indicates an unintended distribution error occurring due to the secondary distribution of the primary distribution pulses. Therefore, where the slow variation portion is used as is to derive an error correction pulse, it is possible to calculate the tertiary distribution position by subtracting the error correction pulse from the secondary distribution position and eliminate the effect of the unintended distribution error with the tertiary distribution pulses derived from the tertiary distribution position.

In this case, the primary distribution pulse calculation unit may identify in advance, on the basis of the movement command, a calculation cycle corresponding to the slow variation portion and a calculation cycle corresponding to the rapid variation portion within the distribution error calculated by the distribution error calculation unit, and the error correction pulse calculation unit may determine, on the basis of the identification result by the primary distribution pulse calculation unit, the slow variation portion and the rapid variation portion within the distribution error calculated by the distribution error calculation unit.

Such a configuration can provide a specific configuration for determining the slow variation portion and the rapid variation portion within the distribution error in the error correction pulse calculation unit.

In this case, in the case where the movement command requires continuous execution of a plurality of linear movements, the primary distribution pulse calculation unit may identify a calculation cycle corresponding to the primary distribution pulse as a calculation cycle corresponding to the slow variation portion when the primary distribution pulse of the predetermined calculation cycle includes a start point or an end point of the linear movement, while the primary distribution pulse calculation unit may identify a calculation cycle corresponding to the primary distribution pulse as a calculation cycle corresponding to the rapid variation portion when the primary distribution pulse of the predetermined calculation cycle includes neither the start point nor the end point of the linear movement.

With such a configuration, when the primary distribution pulse of the predetermined calculation cycle includes a start point or an end point of the linear movement, in the calculation cycle corresponding to the primary distribution pulse, the tertiary distribution position is derived by subtracting the distribution error as is from the secondary distribution position. However, when the primary distribution pulse of the predetermined calculation cycle includes neither the start point nor the end point of the linear movement, in the calculation cycle corresponding to the primary distribution pulse, the tertiary distribution position is derived by subtracting a value obtained by performing an adjustment such that the distribution error variation is relaxed from the secondary distribution position. Therefore, in the trajectory of movement performed according to the tertiary distribution pulse derived from the tertiary distribution position, the position of the end point of each linear movement of the movement command is maintained, but the intermediate portion of each linear movement represents a trajectory in which the end points are connected by a smooth curve because the effect of converting the variations of the primary distribution pulses into slow variation by the secondary distribution is reflected in the intermediate portions of each linear movement positioned between the end points. As a result, the motion obtained by continuously performing a plurality of linear movements of the movement command is corrected into a smooth curved motion.

Therefore, the effect that can be obtained in the embodiments is that work machining accuracy can be increased when the movement directions of the work and the tool include different movement directions.

The invention claimed is:

1. A numerical control device for a tool machine, provided at a tool machine which has a work moving device that moves a work in at least one movement direction and a tool moving device that moves a tool for machining the work in at least one movement direction, in which the movement direction of the work or the movement direction of the tool includes a first movement direction and/or a second movement direction that are different from each other, and in which an acceleration-deceleration time constant of the movement in the first movement direction and an acceleration-deceleration time constant of the movement in the second movement direction are set to mutually different values, the numerical control device serving to control a drive of at least one of the work moving device and the tool moving device, and comprising:

a primary distribution pulse calculation unit that calculates primary distribution pulses obtained by distributing individually a movement amount in the first movement direction included in a movement command of the work or a movement command of the tool and a movement amount in the second movement direction included in a movement command of the work or a movement command of the tool for each of predetermined calculation cycles;

a secondary distribution pulse calculation unit that calculates, for each of the first movement direction and the second movement direction, secondary distribution pulses obtained by distributing the primary distribution pulses of each of the predetermined calculation cycles, which have been calculated by the primary distribution pulse calculation unit, before and after corresponding calculation cycles within ranges of distribution sections across the corresponding calculation cycles and having the acceleration-deceleration time constant of the corresponding first or second movement direction as a section width, and then accumulating the primary distribution pulses for each of the respective predetermined calculation cycles; and a drive control unit that drives at least one of the tool moving device and the work moving device based on the secondary distribution pulses calculated by the secondary distribution pulse calculation unit.

2. The numerical control device for a tool machine according to claim 1, wherein the secondary distribution pulse calculation unit calculates the secondary distribution pulses while adjusting a position of a distribution section so as to equalize a distribution amount of the primary distribution pulses in a range from a start point of the distribution section to the corresponding calculation cycle and a distribution amount of the primary distribution pulses in a range from the corresponding calculation cycle to an end point of the distribution section.

3. A numerical control device for a tool machine, provided at a tool machine which has a work moving device that moves a work in at least one movement direction and a tool moving device that moves a tool for machining the work in at least one movement direction, and in which the movement direction of the work or the movement direction of the tool includes a first movement direction and/or a second movement direction that are different from each other, the numerical control device serving to control a drive of at least one of the work moving device and the tool moving device, and comprising:

a primary distribution pulse calculation unit that calculates primary distribution pulses obtained by distributing individually a movement amount in the first movement direction included in a movement command of the work or a movement command of the tool and a movement amount in the second movement direction included in a movement command of the work or a movement command of the tool for each of predetermined calculation cycles;

a secondary distribution pulse calculation unit that calculates, for each of the first movement direction and the second movement direction, secondary distribution pulses obtained by distributing the primary distribution pulses of each of the predetermined calculation cycles, which have been calculated by the primary distribution pulse calculation unit, within ranges of distribution sections across corresponding calculation cycles and having an acceleration-deceleration time constant of a corresponding one of movement directions as a section width, and then accumulating the primary distribution pulses for each of the respective predetermined calculation cycles, and calculates the secondary distribution pulses while adjusting a position of a distribution section so as to equalize a distribution amount of the primary distribution pulses in a range from a start point of the distribution section to the corresponding calculation cycle and a distribution amount of the primary distribution pulses in a range from the corresponding calculation cycle to an end point of the distribution section;

a tertiary distribution pulse calculation unit that calculates, for each of the first movement direction and the second movement direction, a distribution error which is a difference between a primary distribution position corresponding to a position for each of the respective predetermined calculation cycles or movement according to the primary distribution pulses and a secondary distribution position corresponding to a position for each of the respective predetermined calculation cycles for movement according to the secondary distribution pulses, corrects the secondary distribution position based on the calculated distribution error, and calculates, for each of the first movement direction and the second movement direction, tertiary distribution pulses which are movement amounts of each of the respective predetermined calculation cycles, from a result of the correction; and a drive control unit that drives at least one of the work moving device and the tool moving device on the basis of the tertiary distribution pulses calculated by the tertiary distribution pulse calculation unit.

4. The numerical control device for a tool machine according to claim 3, wherein the tertiary distribution pulse calculation unit includes: a distribution error calculation unit that calculates the distribution error by calculating the primary distribution position based on the primary distribution pulses, calculating the secondary distribution position on the basis of the secondary distribution pulses, and calculating a difference between these two calculated distribution positions; an error correction pulse calculation unit that calculates an error correction pulse by using, within the distribution error calculated by the distribution error calculation unit, a first variation portion that has first variations as is, and adjusting a second variation portion that has second variations larger than the first variations such that variations thereof are relaxed; and a distribution error correction unit that calculates a tertiary distribution position by subtracting the error correction pulse calculated by the error correction pulse calculation unit from the secondary distribution position calculated by the distribution error calculation unit and calculates the tertiary distribution pulses from the calculated tertiary distribution position.

5. The numerical control device for a tool machine according to claim 4, wherein the primary distribution pulse calculation unit identifies in advance, based on the movement command, a calculation cycle corresponding to the first variation portion and a calculation cycle corresponding to the second variation portion within the distribution error calculated by the distribution error calculation unit, and the error correction pulse calculation unit determines, based on the identification result by the primary distribution pulse calculation unit, the first variation portion and the second variation portion within the distribution error calculated by the distribution error calculation unit.

6. The numerical control device for a tool machine according to claim 5, wherein when the movement command requires continuous execution of a plurality of linear movements, the primary distribution pulse calculation unit identifies a calculation cycle corresponding to the primary distribution pulse as a calculation cycle corresponding to the first variation portion when the primary distribution pulse of the predetermined calculation cycle includes a start point or an end point of a linear movement, while the primary distribution pulse calculation unit identifies a calculation cycle corresponding to the primary distribution pulse as a calculation cycle corresponding to the second variation portion when the primary distribution pulse of the predetermined calculation cycle includes neither the start point nor the end point of the linear movement.

* * * * *